(12) United States Patent
Momono

(10) Patent No.: US 9,054,011 B2
(45) Date of Patent: Jun. 9, 2015

(54) MASK AND METHOD FOR MANUFACTURING THE SAME, AND SEMICONDUCTOR DEVICE

(71) Applicant: Renesas Electronics Corporation, Kawasaki-shi, Kanagawa (JP)

(72) Inventor: Hiroyuki Momono, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 26 days.

(21) Appl. No.: 14/079,709

(22) Filed: Nov. 14, 2013

(65) Prior Publication Data

US 2014/0145192 A1 May 29, 2014

(30) Foreign Application Priority Data

Nov. 27, 2012 (JP) ................................. 2012-258646

(51) Int. Cl.
*H01L 29/10* (2006.01)
*H01L 21/00* (2006.01)
*G06F 17/50* (2006.01)
*H01L 27/146* (2006.01)

(52) U.S. Cl.
CPC .... *H01L 27/14683* (2013.01); *H01L 27/14605* (2013.01)

(58) Field of Classification Search
CPC . H01L 27/0207; H01L 22/30; G06F 17/5072; G06F 17/5068
USPC ........ 257/48, 59; 428/195.1; 438/28, 34, 195; 716/55, 50
See application file for complete search history.

(56) References Cited

U.S. PATENT DOCUMENTS

| | | | |
|---|---|---|---|
| 6,664,011 B2* | 12/2003 | Lin et al. ............................ | 430/5 |
| 7,158,210 B2* | 1/2007 | Iizuka et al. ..................... | 355/53 |
| 7,266,803 B2* | 9/2007 | Chou et al. ....................... | 716/51 |
| 7,602,961 B2* | 10/2009 | Yoshikawa et al. ........... | 382/148 |
| 8,209,641 B2* | 6/2012 | Watanabe et al. ............... | 716/53 |
| 8,443,312 B2* | 5/2013 | Tsai et al. ........................ | 716/55 |
| 8,488,866 B2* | 7/2013 | Terasawa et al. ............. | 382/144 |
| 2004/0150805 A1* | 8/2004 | Iizuka et al. ..................... | 355/53 |
| 2005/0006676 A1* | 1/2005 | Watanabe ..................... | 257/290 |
| 2010/0208978 A1* | 8/2010 | Terasawa et al. ............. | 382/145 |
| 2011/0173578 A1* | 7/2011 | Tsai et al. ........................ | 716/55 |
| 2013/0017475 A1* | 1/2013 | Terasawa et al. ................. | 430/5 |
| 2014/0027873 A1* | 1/2014 | Kashihara ..................... | 257/432 |

FOREIGN PATENT DOCUMENTS

| JP | 9-17715 A | 1/1997 |
|---|---|---|
| JP | 10-335205 A | 12/1998 |
| JP | 11-145047 A | 5/1999 |
| JP | 2008-205312 A | 9/2008 |

* cited by examiner

*Primary Examiner* — Nikolay Yushin
(74) *Attorney, Agent, or Firm* — Sughrue Mion, PLLC

(57) ABSTRACT

A mask includes a substrate, an effective pixel formation region and a reference pattern formation region. A pixel pattern for forming a pixel component that constitutes a pixel is arranged in the effective pixel formation region. A reference pattern for indicating a reference position where pixel pattern should be arranged in the effective pixel formation region is arranged in the reference pattern formation region. Pixel pattern is arranged to be displaced from the reference position toward a center side of the effective pixel formation region.

19 Claims, 21 Drawing Sheets

MASK AND METHOD FOR MANUFACTURING THE SAME, AND SEMICONDUCTOR DEVICE

BACKGROUND OF THE INVENTION

1. Field of the Invention

The present invention relates to a mask and a method for manufacturing the same, and a semiconductor device. Particularly, the present invention relates to a semiconductor device having a so-called shrink region, and a method for manufacturing the same.

2. Description of the Background Art

From the perspective of suppressing displacement of an overlap position during the process of overlapping and forming different two patterns in the formation of a semiconductor device, a pattern for checking an amount of displacement is sometimes used. This pattern includes a so-called slide caliper pattern disclosed in, for example, Japanese Patent Laying-Open No. 10-335205, Japanese Patent Laying-Open No. 9-17715, Japanese Patent Laying-Open No. 11-145047, and Japanese Patent Laying-Open No. 2008-205312.

In a CMOS (Complementary Metal Oxide Semiconductor) image sensor, for example, it is preferable that, in an effective pixel region where a plurality of pixels are arranged, a light blocking film and the like constituting the plurality of pixels are arranged to be displaced toward a center side of the effective pixel region, as compared with a light blocking film and the like in a region outside the effective pixel region. With such configuration, the light blocking film blocks only the light to be blocked, such as the light that enters a pixel other than a desired pixel, and the effect of suppressing blockage of the light that enters the desired pixel is enhanced. As a result, the efficiency of the light blocking film that blocks the light appropriately is enhanced.

At present, however, there is no established method for indicating, with a high degree of accuracy, a position where the pixel should be arranged in the effective pixel region. It is conceivable to adopt the idea of the slide caliper pattern disclosed in the aforementioned patent documents to control the amount of overlap displacement in the formation of the effective pixel region and the region outside the effective pixel region. However, all of the aforementioned patent documents merely disclose a method for controlling a relative amount of displacement between different two patterns.

Therefore, according to the method disclosed in the aforementioned patent documents, the aforementioned amount of overlap displacement can be controlled with a high degree of accuracy, while it is impossible to check an amount of displacement from a reference position where each of the effective pixel region and the region outside the effective pixel region should be formed. Specifically, for example, when both of two patterns are displaced to have the same phase, this can produce the illusion that processing was performed with a very high degree of overlap accuracy.

SUMMARY OF THE INVENTION

According to one embodiment, a mask includes: a substrate; an effective pixel formation region; and a reference pattern formation region. A reference pattern for indicating a reference position where the pixel pattern should be arranged in the effective pixel formation region is arranged in the reference pattern formation region. The pixel pattern is arranged to be displaced from the reference position toward a center side of the effective pixel formation region.

According to another embodiment, a semiconductor device includes: a semiconductor substrate; an effective pixel region; and a reference portion arrangement region. A reference portion for indicating a reference position where the pixel component should be arranged in the effective pixel region is arranged in the reference portion arrangement region. The pixel component is arranged to be displaced from the reference position toward a center side of the effective pixel region.

According to a method for manufacturing a mask in still another embodiment, a substrate having a main surface is first prepared. First data drawn on a first layer is prepared, the first data being for drawing a pixel pattern in an effective pixel formation region on the main surface of the substrate where the pixel pattern is formed, the pixel pattern being for forming a pixel component that constitutes a pixel. Second data drawn on a second layer different from the first layer is prepared, the second data being for drawing a reference pattern in a reference pattern formation region which surrounds the effective pixel formation region and where the reference pattern is formed, the reference pattern being for indicating a reference position where the pixel pattern should be arranged in the effective pixel formation region. By using the first data, drawing is performed. By using the second data, the reference pattern is drawn in the reference pattern formation region.

According to a method for manufacturing a mask in a further embodiment, a substrate having a main surface is first prepared. First data for drawing a pixel pattern in an effective pixel formation region is prepared. Second data for drawing a reference pattern in a reference pattern formation region which surrounds the effective pixel formation region and where the reference pattern is formed is prepared, the reference pattern being for indicating a reference position where the pixel pattern should be arranged in the effective pixel formation region. Identification data for distinguishing between the effective pixel formation region and the reference pattern formation region is prepared. By using the first data, drawing is performed, with the identification data superimposed on the first data. By using the second data, the reference pattern is drawn in the reference pattern formation region.

According to a method for manufacturing a mask in a further embodiment, a substrate is first prepared similarly to the aforementioned method for manufacturing a mask. First data drawn in a first cell, for drawing a pixel pattern in an effective pixel formation region is prepared. Second data drawn in a second cell, for drawing a reference pattern in a reference pattern formation region is prepared. By using the second data, the reference pattern is drawn in the reference pattern formation region. The first cell and the second cell are drawn on the same layer.

According to a method for manufacturing a mask in a further embodiment, a substrate is first prepared similarly to the aforementioned method for manufacturing a mask. Coordinate ranges, on the main surface of the substrate, of an effective pixel formation region and a reference pattern formation region are specified. First data for drawing the pixel pattern in the effective pixel formation region and second data for drawing the reference pattern in the reference pattern formation region are prepared. By using the first data, drawing is performed, while identifying the coordinate range. By using the second data, the reference pattern is drawn in the reference pattern formation region, while identifying the coordinate range.

According to one embodiment, there can be provided a mask in which an amount of displacement of the pixel pattern from the reference position can be controlled with a higher degree of accuracy by using the reference pattern.

According to another embodiment, there can be provided a semiconductor device in which an amount of displacement of the pixel component from the reference position can be controlled with a higher degree of accuracy by using the reference portion.

According to a method for manufacturing a mask in still another embodiment, there can be provided a mask in which an amount of displacement of the pixel pattern from the reference position can be controlled with a higher degree of accuracy by using the reference pattern. A method for manufacturing a mask in other embodiments produces the effect basically similar to that of the aforementioned method for manufacturing a mask.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment will be described hereinafter with reference to the drawings.

(First Embodiment)

A configuration of a mask used in processing of a semiconductor device according to one embodiment will be described first with reference to FIGS. 1 and 2.

Figure 1:
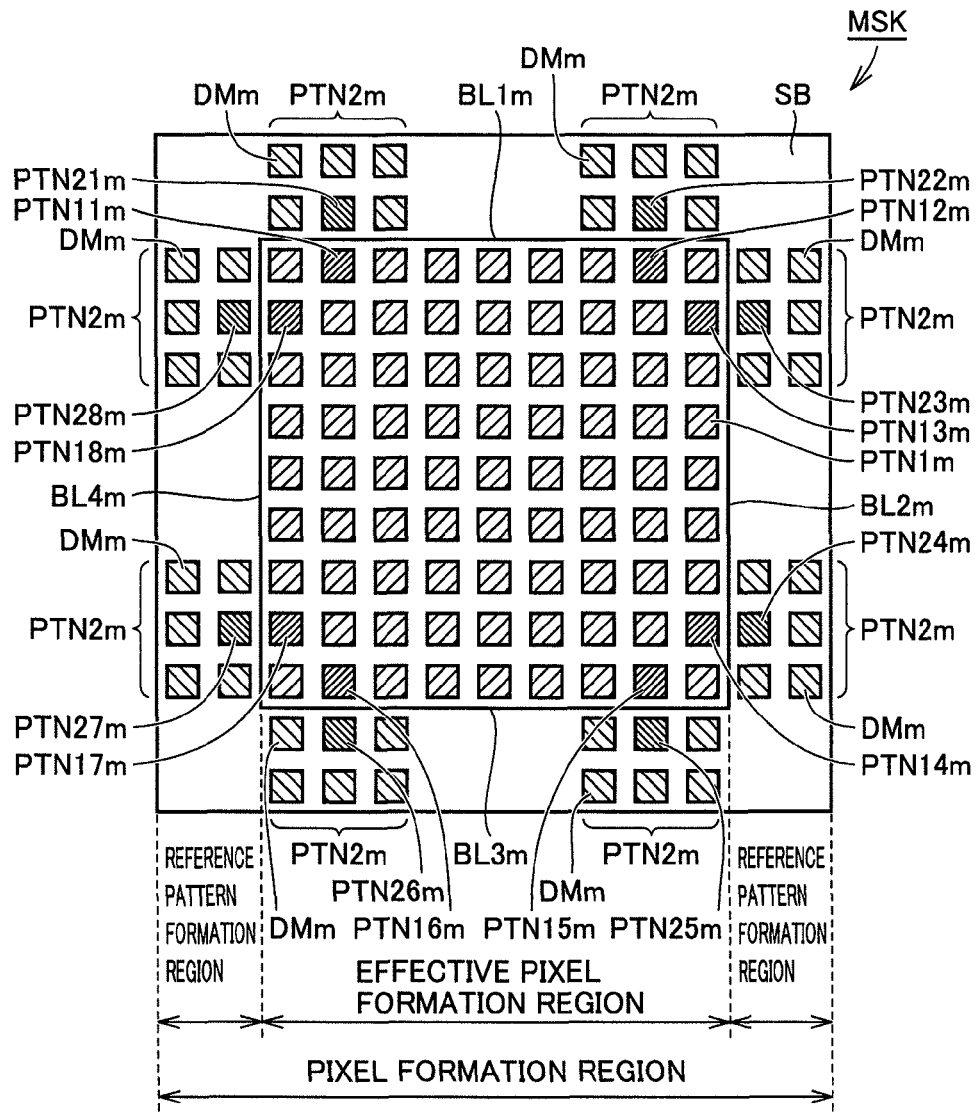
FIG. 1 is a schematic plan view of a mask according to a first embodiment.

Referring to FIG. 1, a mask MSK according to the embodiment is, for example, a mask used to form a CMOS image sensor. Mask MSK is, for example, used to form a light blocking film, an inner lens or a thin film of a color filter that constitutes a pixel such as a photodiode formed in the CMOS image sensor.

Mask MSK has such a configuration that a plurality of patterns for forming the aforementioned light blocking film, inner lens, color filter or the like are arranged on one main surface of a substrate SB made of a generally known material (such as glass).

Specifically, the main surface of mask MSK is a so-called pixel formation region, which is a region for forming a pixel region of the CMOS image sensor. The pixel formation region has an effective pixel formation region and a reference pattern formation region.

Effective pixel formation region is a region for forming an effective pixel region where an actual pixel constituting the CMOS image sensor is formed. When mask MSK has, for example, a rectangular planar shape, the effective pixel formation region is arranged in a central portion of the main surface of the rectangle.

The reference pattern formation region is arranged to surround the effective pixel formation region on the main surface of substrate SB, that is, is arranged at an outer perimeter portion of the effective pixel formation region on the main surface of substrate SB. Boundary lines BL1$m$, BL2$m$, BL3$m$, and BL4$m$ as an outer perimeter line of the effective pixel formation region serve as a boundary between the effective pixel formation region and the reference pattern formation region. The effective pixel formation region is arranged to be surrounded by a rectangle forming these boundary lines BL1$m$ to BL4$m$, and the reference pattern formation region is arranged outside these boundary lines BL1$m$ to BL4$m$.

A plurality of pixel patterns PTN1$m$ are arranged in the effective pixel formation region. Here, a plurality of patterns for forming a pixel component such as, for example, the light blocking film that constitutes a pixel are arranged in rows and columns as pixel patterns PTN1m. These patterns are made of a generally known material (such as chromium). The pixel component of the CMOS image sensor is formed by these pixel patterns PTN1m.

A plurality of non-pixel patterns PTN2m are arranged in the reference pattern formation region. Non-pixel patterns PTN2m are patterns other than pixel patterns PTN1m and are patterns for forming a component (e.g., a reference portion and the like described below) other than the pixel component.

Non-pixel patterns PTN2m are arranged in a region that faces the neighborhood of opposing ends of each of boundary lines BL1m to BL4m. In other words, a group of non-pixel patterns PTN2m is arranged at two locations in the region that faces each of boundary lines BL1m to BL4m, and the group of non-pixel patterns PTN2m is arranged at a total of eight locations.

Each group of non-pixel patterns PTN2m is formed by one reference pattern PTN21m to PTN28m and a plurality of (in the present embodiment, five) dummy formation patterns DMm.

Reference patterns PTN21m and PTN22m are arranged in the region that faces boundary line BL1m. Reference patterns PTN23m and PTN24m are arranged in the region that faces boundary line BL2m. Reference patterns PTN25m and PTN26m are arranged in the region that faces boundary line BL3m. Reference patterns PTN27m and PTN28m are arranged in the region that faces boundary line BL4m. In other words, reference patterns PTN21m to PTN28m are arranged to face pixel patterns PTN1m with boundary lines BL1m to BL4m of the effective pixel formation region interposed therebetween.

In FIG. 1, a spacing between pixel patterns PTN1m in the effective pixel formation region is substantially equal to a spacing between non-pixel patterns PTN2m in the reference pattern formation region. All of pixel patterns PTN1m and non-pixel patterns PTN2m have the same size in plan view, and pixel pattern PTN1m and non-pixel pattern PTN2m that face each other with each of boundary lines BL1m to BL4m interposed therebetween are arranged to be flush with each other (to have an equal coordinate in the direction along each of boundary lines BL1m to BL4m).

For example, reference pattern PTN21m and pixel pattern PTN1m (pixel pattern PTN11m) that faces reference pattern PTN21m with boundary line BL1m interposed therebetween are arranged to have an equal coordinate in the horizontal direction in the figure along boundary line BL1m. Pixel pattern PTN11m (reference pattern PTN21m) is arranged, for example, at a position of the second from the left end of nine pixel patterns PTN1m lined in the horizontal direction in FIG. 1. The same is applied as well to other reference patterns PTN22m to PTN28m. Each of reference patterns PTN22m to PTN28m is arranged, for example, at a position having a coordinate equal to that of the second row (or column) from the row (or column) end of pixel patterns PTN1m.

Actually, however, the spacing between adjacent pixel patterns PTN1m is not equal to the spacing between adjacent non-pixel patterns PTN2m (in the row direction or column direction in the figure). Specifically, referring to FIG. 2, pixel patterns PTN1m as a whole are arranged to be displaced from non-pixel patterns PTN2m toward a center side (to be concentrated on the center side) of the effective pixel formation region. In other words, the spacing between a pair of adjacent pixel patterns PTN1m is shorter than the spacing between a pair of adjacent non-pixel patterns PTN2m. As a result, for example, reference pattern PTN21m and pixel pattern PTN11m that faces reference pattern PTN21m with boundary line BL1m interposed therebetween have different coordinates in the horizontal direction in the figure along boundary line BL1m.

Reference pattern PTN21m to PTN28m is arranged to indicate a reference position where pixel pattern PTN11m to PTN18m in the effective pixel formation region, which faces reference pattern PTN21m to PTN28m with boundary line BL1m to BL4m interposed therebetween, should be arranged in the direction along boundary line BL1m to BL4m. Specifically, for example, reference pattern PTN21m is arranged at a position equal to the reference position where pixel pattern PTN11m should be arranged in the horizontal direction in the figure along boundary line BL1m. Here, the reference position where the pixel pattern should be arranged refers to a position where pixel pattern PTN1m is arranged when it is not necessary to take into consideration positional displacement of pixel pattern PTN1m in the effective pixel formation region from non-pixel pattern PTN2m (that faces pixel pattern PTN1m with the boundary line interposed therebetween) (when there is no displacement of pixel pattern PTN1m). Therefore, each of pixel patterns PTN11m to PTN18m in FIG. 1 is displaced and arranged to be concentrated on the center side with respect to the reference position where each of pixel patterns PTN11m to PTN18m should exist (position where each of reference patterns PTN21m to PTN28m is arranged).

In the reference pattern formation region, dummy formation patterns DMm are formed around each of reference patterns PTN21m to PTN28m to be spaced apart from each of reference patterns PTN21m to PTN28m. Here, dummy formation patterns DMm are arranged in a first direction (e.g., the row direction in the figure), a second direction (e.g., the column direction in the figure) and a third direction (e.g., the oblique direction of about 45° in the figure) of reference patterns PTN21m to PTN28m in plan view. Each of reference patterns PTN21m to PTN28m is arranged such that a spacing, in a direction intersecting with boundary lines BL1m to BL4m, between each of reference patterns PTN21m to PTN28m and each of pixel patterns PTN11m to PTN18m that faces each of reference patterns PTN21m to PTN28m with boundary lines BL1m to BL4m interposed therebetween is substantially equal to the spacing between a pair of adjacent pixel patterns PTN1m. Therefore, there is no space for dummy formation pattern DMm in a portion of each of reference patterns PTN21m to PTN28m on the boundary line BL1m to BL4m side, and dummy formation pattern DMm is not arranged. As a result, five dummy formation patterns DMm are arranged around each reference pattern. The present invention is not, however, limited thereto and a larger number of dummy formation patterns DMm may be arranged.

A spacing between dummy formation patterns DMm and the reference pattern in the aforementioned first or second direction is longer than a spacing between a pair of adjacent pixel patterns PTN1m in the aforementioned first or second direction, and is the same as the spacing when pixel pattern PTN1m is arranged not to be displaced from the reference pattern.

The positional displacement of pixel patterns PTN11m to PTN18m from reference patterns PTN21m to PTN28m occurs due to the following two factors. The first factor is that pixel patterns PTN1m as a whole are arranged to be displaced from non-pixel patterns PTN2m toward the center side of the effective pixel formation region as described above. Since pixel patterns PTN1m as a whole are arranged to come closer to the center side of the effective pixel formation region, the spacing between pixel patterns PTN1m is shorter than the spacing between non-pixel patterns PTN2m.

Since the plurality of pixel patterns PTN1$m$ as a whole are arranged to be displaced toward the center side of the effective pixel formation region, the effective pixel formation region appears to shrink toward the center side of the main surface of substrate SB, as compared with the case in which pixel patterns PTN1$m$ are not displaced toward the center side as described above. Therefore, in the following description, the state in which pixel patterns PTN1$m$ are concentrated on the center side will be referred to as "shrink".

The second factor of the positional displacement is that, due to the accuracy in processing, an error occurs with respect to the position of non-pixel patterns PTN2$m$ when pixel patterns PTN1$m$ in the effective pixel formation region are formed. This is caused by various factors such as manual operation and dimensional accuracy of facilities. Due to a combination of these factors, a point whose original position is c1 is displaced to c2 by z in the right direction in the figure in the effective pixel formation region, for example, as shown in FIG. 2.

Figure 2:
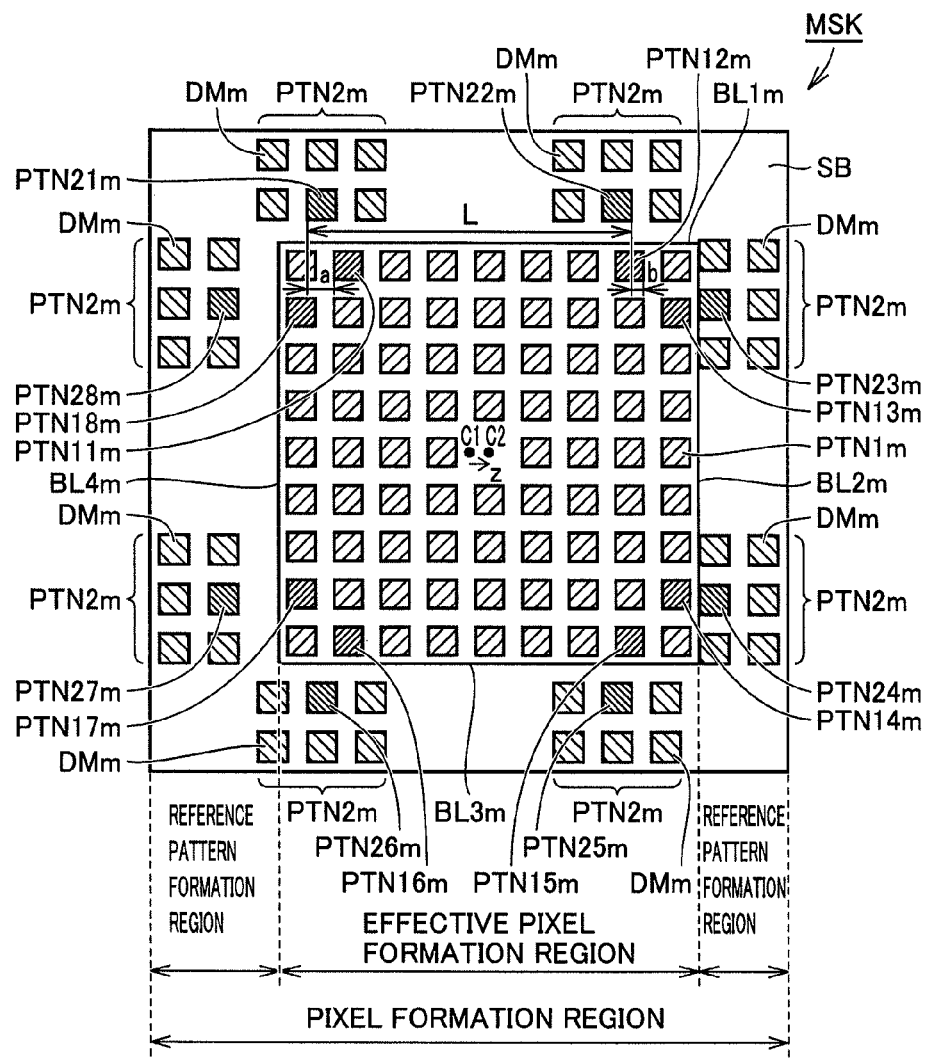
FIG. 2 is a schematic plan view for describing positional displacement of an effective pixel formation region from a reference pattern formation region of the mask according to the first embodiment.

In addition, as shown in FIG. 2, a left-side edge of pixel pattern PTN11$m$ is displaced from reference pattern PTN21$m$ by a in the right direction in the figure, and a right-side edge of pixel pattern PTN12$m$ is displaced from reference pattern PTN22$m$ by b in the right direction in the figure.

Assume that L represents a distance between a left-side edge of reference pattern PTN21$m$ and a right-side edge of reference pattern PTN22$m$ in the horizontal direction in the figure. Then, assuming that S represents a shrink rate, the following equations are obtained:

$$a = \frac{L}{2} \cdot S + z \quad (1)$$

$$b = \frac{L}{2} \cdot S - z. \quad (2)$$

These equations are derived by combining the aforementioned two factors of the positional displacement.

Based on the aforementioned equations, shrink rate S is expressed by the following equation:

$$S = \frac{a+b}{L}. \quad (3)$$

An amount of displacement z is expressed by the following equation:

$$z = \frac{a-b}{2}. \quad (4)$$

To simplify the figure, pixel pattern PTN1$m$ and non-pixel pattern PTN2$m$ (reference patterns PTN21$m$ to PTN28$m$ and dummy formation patterns DM$m$) have a rectangular planar shape. The present invention is not, however, limited thereto and these patterns may have any planar shapes.

Figure 3:
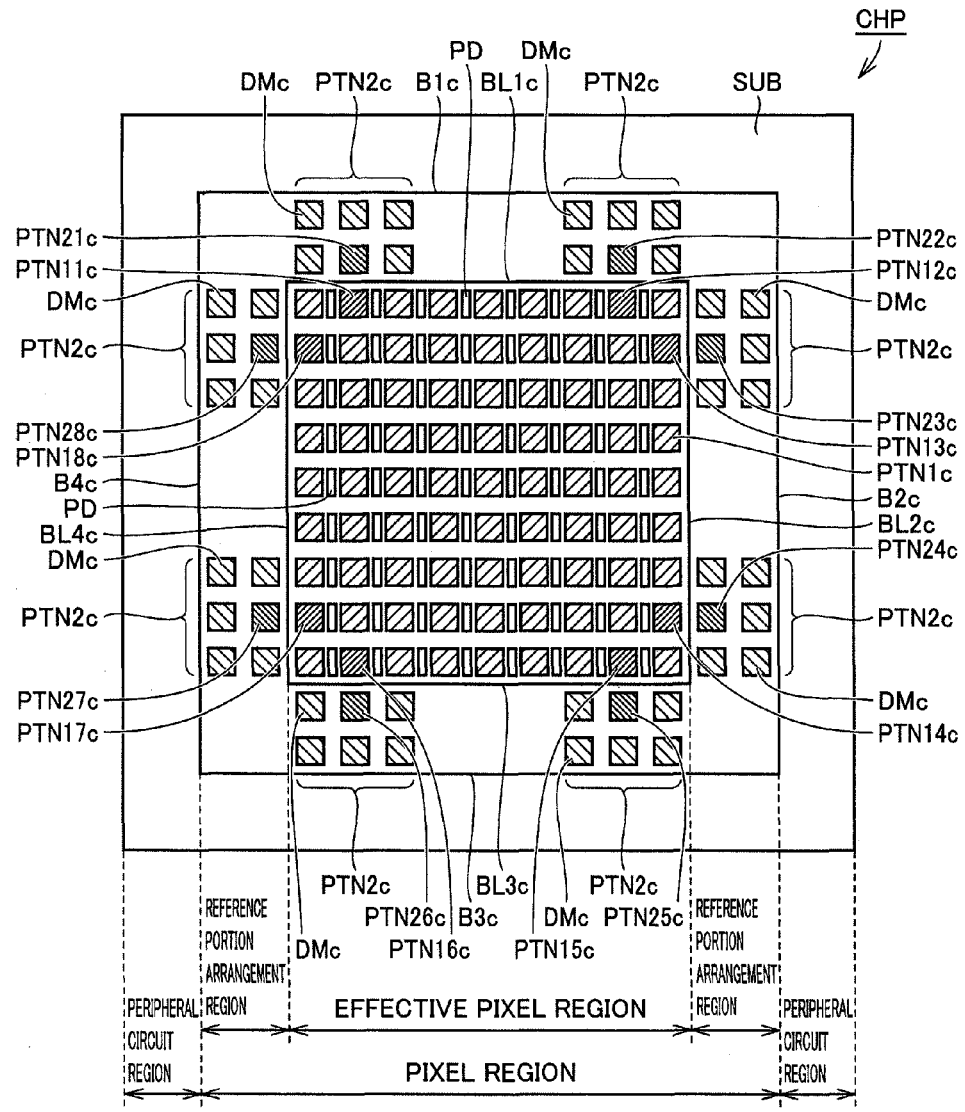
FIG. 3 is a schematic plan view of a semiconductor chip formed by using the mask according to the first embodiment.

Referring to FIG. 3, a semiconductor chip CHP according to the embodiment is the CMOS image sensor as a semiconductor device formed by using mask MSK in FIGS. 1 and 2. Semiconductor chip CHP is arranged on one main surface of a semiconductor substrate SUB made of a generally known material (e.g., single crystal of silicon).

The one main surface of semiconductor substrate SUB has a pixel region and a peripheral circuit region. The pixel region is a main portion of semiconductor chip CHP where a pixel such as a photodiode of the CMOS image sensor is arranged. When semiconductor chip CHP has, for example, a rectangular planar shape, the pixel region is arranged in a central portion of the main surface of the rectangle.

The peripheral circuit region is, for example, a region where a circuit for input/output and the like of an electrical signal from/to a circuit external to semiconductor chip CHP is arranged. The peripheral circuit region is arranged to surround the pixel region on the main surface of semiconductor substrate SUB, that is, is arranged at an outer perimeter portion of the pixel region on the main surface of semiconductor substrate SUB. Boundary lines B1$c$, B2$c$, B3$c$, and B4$c$ as an outer perimeter line of the pixel region serve as a boundary between the pixel region and the peripheral circuit region. The pixel region is arranged to be surrounded by a rectangle forming these boundary lines B1$c$ to B4$c$, and the peripheral circuit region is arranged outside these boundary lines B1$c$ to B4$c$.

The pixel region has an effective pixel region and a reference portion arrangement region. When the pixel region has, for example, a rectangular planar shape, the effective pixel region is arranged in a central portion of the main surface of the rectangle. The effective pixel region is a main portion of the pixel region having an effective function as a photodiode that converts the light absorbed by the pixel into an electrical signal.

The reference portion arrangement region is arranged to surround the effective pixel region on the main surface of the pixel region, that is, is arranged at an outer perimeter portion of the effective pixel region on the main surface of semiconductor substrate SUB. Boundary lines BL1$c$, BL2$c$, BL3$c$, and BL4$c$ as an outer perimeter line of the effective pixel region serve as a boundary between the effective pixel region and the reference portion arrangement region. The effective pixel region is arranged to be surrounded by a rectangle forming these boundary lines BL1$c$ to BL4$c$, and the reference portion arrangement region is arranged outside these boundary lines BL1$c$ to BL4$c$.

A plurality of pixel components PTN1$c$ are arranged in the effective pixel region. Pixel components PTN1$c$ are pixel components such as the light blocking film, the inner lens and the color filter formed by pixel pattern PTN1$m$ of mask MSK. The plurality of pixel components PTN1$c$ are arranged in rows and columns, similarly to pixel patterns PTN1$m$.

A photodiode PD as the pixel is arranged in the effective pixel region in FIG. 3. By way of example, photodiode PD is shown at a position sandwiched between a pair of pixel components PTN1$c$ arranged in rows and columns. This is, however, for simplification of the figure and the configuration of photodiode PD is not limited thereto.

A plurality of non-pixel components PTN2$c$ are arranged in the reference portion arrangement region. Although non-pixel components PTN2$c$ are arranged as the same layer as that of pixel components PTN1$c$, non-pixel components PTN2$c$ are components that are not the pixel components.

Non-pixel components PTN2$c$ are arranged in a region that faces the neighborhood of opposing ends of each of boundary lines BL1$c$ to BL4$c$. In other words, a group of non-pixel components PTN2$c$ is arranged at two locations in the region that faces each of boundary lines BL1$c$ to BL4$c$, and the group of non-pixel components PTN2$c$ is arranged at a total of eight locations.

Each group of non-pixel components PTN2$c$ is formed by one reference portion PTN21$c$ to PTN28$c$ and a plurality of (in the present embodiment, five) dummy structures DM$c$. Reference portions PTN21$c$ to PTN28$c$ are formed by reference patterns PTN21m to PTN28m, and dummy structure DMc is formed by dummy formation pattern DMm.

As described above, pixel component PTN1c is formed by pixel pattern PTN1m of mask MSK, and non-pixel component PTN2c is formed by non-pixel pattern PTN2m of mask MSK. Therefore, pixel component PTN1c and non-pixel component PTN2c have a configuration basically similar to that of pixel pattern PTN1m and non-pixel pattern PTN2m.

Specifically, pixel components PTN1c (including pixel components PTN11c to PTN18c) as a whole are arranged to be displaced from non-pixel components PTN2c toward the center side of the effective pixel region, that is, are arranged to shrink. On the other hand, particularly reference portions PTN21c to PTN28c of non-pixel component PTN2c are arranged to face pixel components PTN11c to PTN18c in the effective pixel region with boundary lines BL1c to BL4c interposed therebetween, respectively. Reference portion PTN21c to PTN28c is arranged to indicate a reference position where pixel component PTN11c to PTN18c in the effective pixel region should be arranged in the direction along boundary line BL1m to BL4m.

In the reference portion arrangement region, dummy structures DMc are formed around each of reference portions PTN21c to PTN28c to be spaced apart from each of reference portions PTN21c to PTN28c.

The remaining configuration of each portion of pixel component PTN1c and non-pixel component PTN2c is basically similar to that of each portion of pixel pattern PTN1m and non-pixel pattern PTN2m described above.

To simplify the figure, pixel component PTN1c and non-pixel component PTN2c (reference portions PTN21c to PTN28c and dummy structures DMc) have a rectangular planar shape. The present invention is not, however, limited thereto and these patterns may have any planar shapes.

Next, the function and effect of the embodiment will be described. First, with reference to FIG. 4, description will be given to the reason why the patterns and the like are shrunk in the effective pixel (formation) region of mask MSK and semiconductor chip CHP according to the embodiment.

Figure 4:
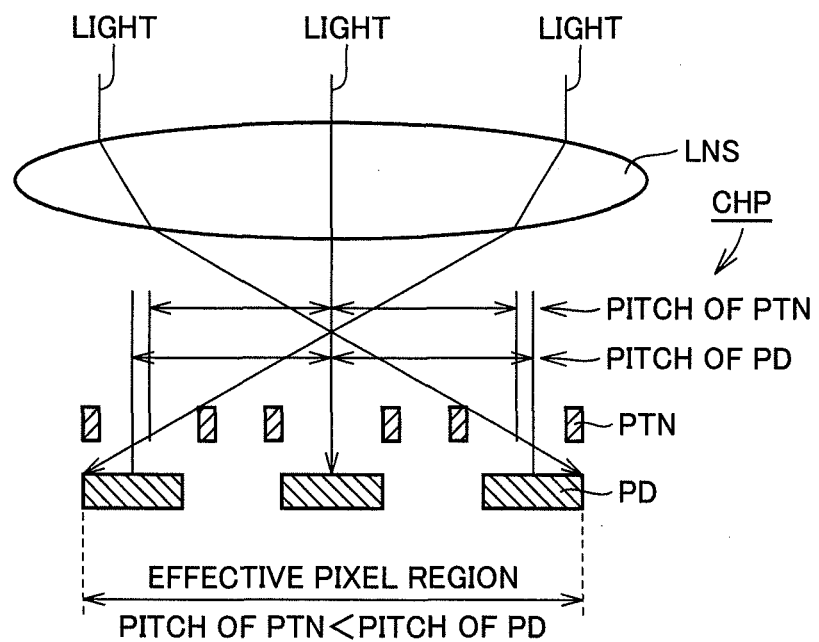
FIG. 4 is a schematic cross-sectional view showing a manner of light entering an effective pixel region of the semiconductor chip.

Referring to FIG. 4, the light from directly above a lens LNS arranged above semiconductor chip CHP, which enters particularly photodiode PD (effective pixel region) of semiconductor chip CHP (CMOS image sensor) through lens LNS, for example, passes through lens LNS as described below. The light passing through a central portion of lens LNS enters photodiode PD in a central portion of the effective pixel region, with little refraction by lens LNS. In contrast, the light entering lens LNS from an end of lens LNS is refracted by lens LNS and travels in the direction having a large angle with respect to the vertical direction in FIG. 4. As described above, as a distance between the position where the light enters lens LNS and the central portion of lens LNS becomes longer, the light is refracted by lens LNS more greatly.

The light blocking film is arranged above each photodiode PD arranged in the effective pixel region. This light blocking film suppresses the light that unintentionally enters photodiode PD arranged next to desired photodiode PD on the main surface of semiconductor chip CHP, and is shown as a light blocking film PTN in FIG. 4. For example, pixel component PTN1c in FIG. 3 corresponds to light blocking film PTN in FIG. 4. Therefore, light blocking film PTN may be arranged, for example, in a region adjacent to photodiode PD in plan view.

However, if the incident light is greatly refracted due to the function of lens LNS as described above, light blocking film PTN may block not only the light to be blocked but also a part of the light that should enter desired photodiode PD, particularly at an end of the effective pixel region.

In order to solve the aforementioned problem, light blocking film PTN in semiconductor chip CHP is preferably shrunk toward the center side in plan view in the effective pixel region. With such configuration, light blocking film PTN is not arranged in a relatively outer portion of the effective pixel region in plan view, and thus, there can be reduced a possibility that the light refracted greatly by lens LNS at the end of the effective pixel region is unintentionally blocked by light blocking film PTN. For the aforementioned reason, pixel pattern PTN1m of mask MSK and pixel component PTN1c of semiconductor chip CHP are shrunk as above.

However, if it is impossible to grasp, with a high degree of accuracy, an amount of displacement of pixel pattern PTN1m of mask MSK due to shrink from the reference position where pixel pattern PTN1m should be arranged, for example, it is difficult to control the amount of displacement with a high degree of accuracy. Until now, however, there has not been established means for indicating the reference position where the pixel pattern should be arranged.

Thus, in the embodiment, reference patterns PTN21m to PTN28m indicating the reference position in the case of no shrink are provided. Since reference patterns PTN21m to PTN28m can be formed without taking shrink into consideration, reference patterns PTN21m to PTN28m can be easily formed in accordance with the ordinary design specifications. Therefore, by measuring the positional displacement of pixel patterns PTN11m to PTN18m from reference patterns PTN21m to PTN28m, the amount of displacement of pixel patterns PTN11m to PTN18m from the reference position can be grasped with a high degree of accuracy and the amount of displacement can be controlled to have a desired value.

Reference patterns PTN21m to PTN28m are arranged to face pixel patterns PTN11m to PTN18m with boundary lines BL1m to BL4m interposed therebetween, respectively. Reference patterns PTN21m to PTN28m indicate the reference position where pixel patterns PTN11m to PTN18m should be arranged in the direction along boundary line BL. Since a distance between pixel patterns PTN11m to PTN18m and reference patterns PTN21m to PTN28m is short, the position of pixel patterns PTN11m to PTN18m can be grasped more accurately.

In the embodiment, dummy formation patterns DMm are arranged to surround each of reference patterns PTN21m to PTN28m. Therefore, there can be reduced a possibility that the shape of reference patterns PTN21m to PTN28m changes due to the optical proximity effect, the micro-loading effect and the like when reference patterns PTN21m to PTN28m are formed by patterning.

In other words, as for the pattern that exists at the end in plan view and does not have the dummy pattern therearound, there is a possibility that the shape of the pattern changes due to the optical proximity effect, the micro-loading effect and the like. However, dummy formation patterns DMm surround each of reference patterns PTN21m to PTN28m having an important role to indicate the reference position in mask MSK, and thus, reference patterns PTN21m to PTN28m can be arranged in the central portion in plan view. With such configuration, surrounding dummy formation patterns DMm play a role to protect against damage to reference patterns PTN21m to PTN28m, and thus, the change in shape of reference patterns PTN21m to PTN28m can be suppressed.

As described above, there is no space for dummy formation pattern DMm in the portion of each of reference patterns PTN21m to PTN28m on the boundary line BL1m to BL4m side, and dummy formation pattern DMm is not arranged.

However, in the portion of each of reference patterns PTN21m to PTN28m on the boundary line BL1m to BL4m side, pixel pattern PTN1m having a configuration similar to that of reference patterns PTN21m to PTN28m is arranged in the effective pixel formation region beyond boundary lines BL1m to BL4m. In other words, each of reference patterns PTN21m to PTN28m has this pixel pattern PTN1m in the direction on the boundary line BL1m to BL4m side. Since this pixel pattern PTN1m functions similarly to dummy formation pattern DMm, the aforementioned effect of suppressing the change in shape of reference patterns PTN21m to PTN28m can be further enhanced.

In addition, because of the configuration similar to that of aforementioned mask MSK in semiconductor chip CHP, the function and effect similar to those of aforementioned mask MSK are produced.

(Second Embodiment)

The present embodiment is different from the first embodiment in terms of the planar shape of the reference pattern and the reference portion. A configuration of a mask according to the present embodiment will be described first with reference to FIGS. 5 and 6.

Figure 5:
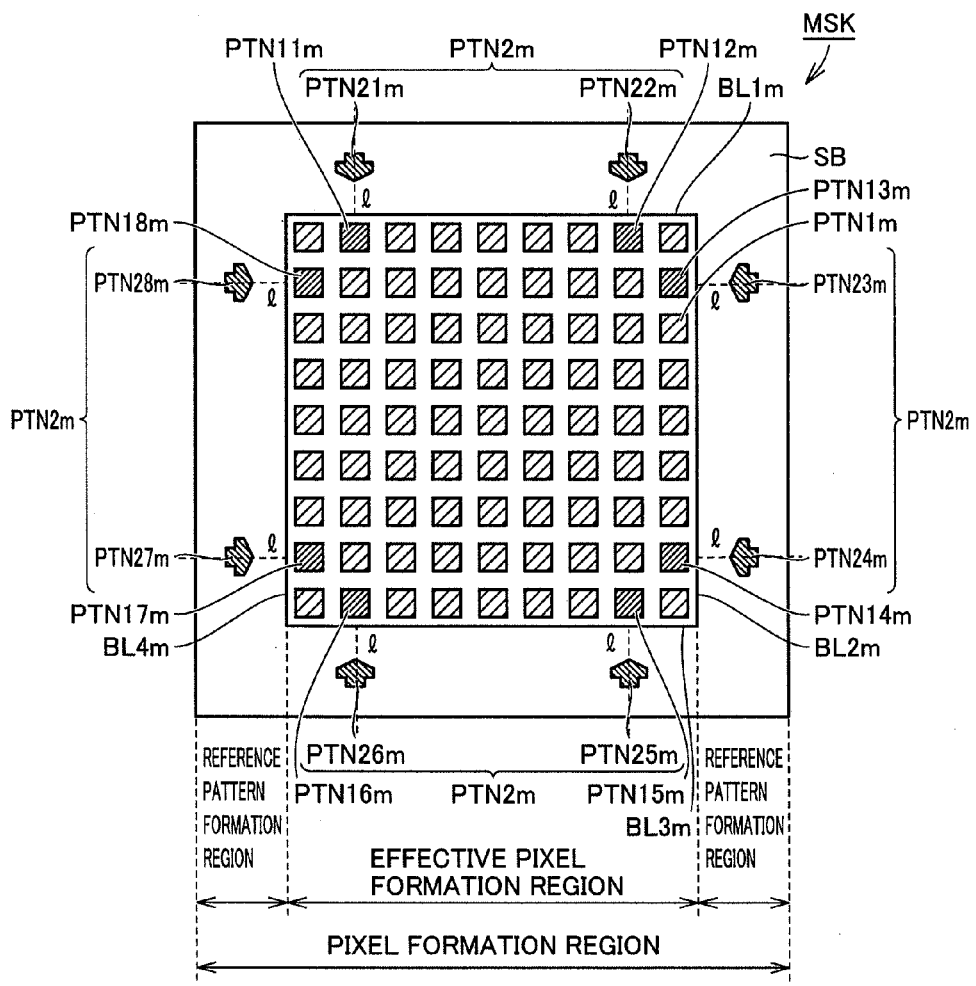
FIG. 5 is a schematic plan view of a first example of a mask according to a second embodiment.

Referring to FIG. 5, mask MSK according to the present embodiment has a configuration basically similar to that of mask MSK according to the first embodiment. However, in mask MSK in FIG. 5, non-pixel pattern PTN2m arranged in the reference pattern formation region has an arrow-like (wedge-like) planar shape.

Specifically, non-pixel patterns PTN2m are arranged in a region that faces the neighborhood of opposing ends of each of boundary lines BL1m to BL4m. Two non-pixel patterns PTN2m are arranged in the region that faces each of boundary lines BL1m to BL4m, and a total of eight non-pixel patterns PTN2m are arranged. However, only one reference pattern PTN21m to PTN28m is arranged in each non-pixel pattern PTN2m. Therefore, in mask MSK in FIG. 5, dummy formation pattern DMm is not arranged. However, a position where each of reference patterns PTN21m to PTN28m is arranged in mask MSK in FIG. 5 is the same as that in mask MSK in FIG. 1. Specifically, each of reference patterns PTN21m to PTN28m is arranged at the position having a coordinate equal to that of the second row (or column) from the row (or column) end of pixel patterns PTN1m.

Reference pattern PTN2m (PTN21m to PTN28m) has a planar shape that is symmetric with respect to an imaginary straight line 1 as a symmetric line extending perpendicularly to each of boundary lines BL1m to BL4m on the main surface of substrate SB of mask MSK. The wedge-like planar shape of reference patterns PTN21m to PTN28m in FIG. 5 is used as one example of the shape that satisfies the aforementioned symmetry condition. Therefore, referring to FIG. 6, for example, reference patterns PTN21m to PTN28m in the present embodiment may have a rhombic planar shape, instead of the wedge-like shape shown in FIG. 5. In this case as well, these rhombic reference patterns PTN21m to PTN28m have a planar shape that is symmetric with respect to an imaginary straight line as a symmetric line extending perpendicularly to each of boundary lines BL1m to BL4m.

Figure 6:
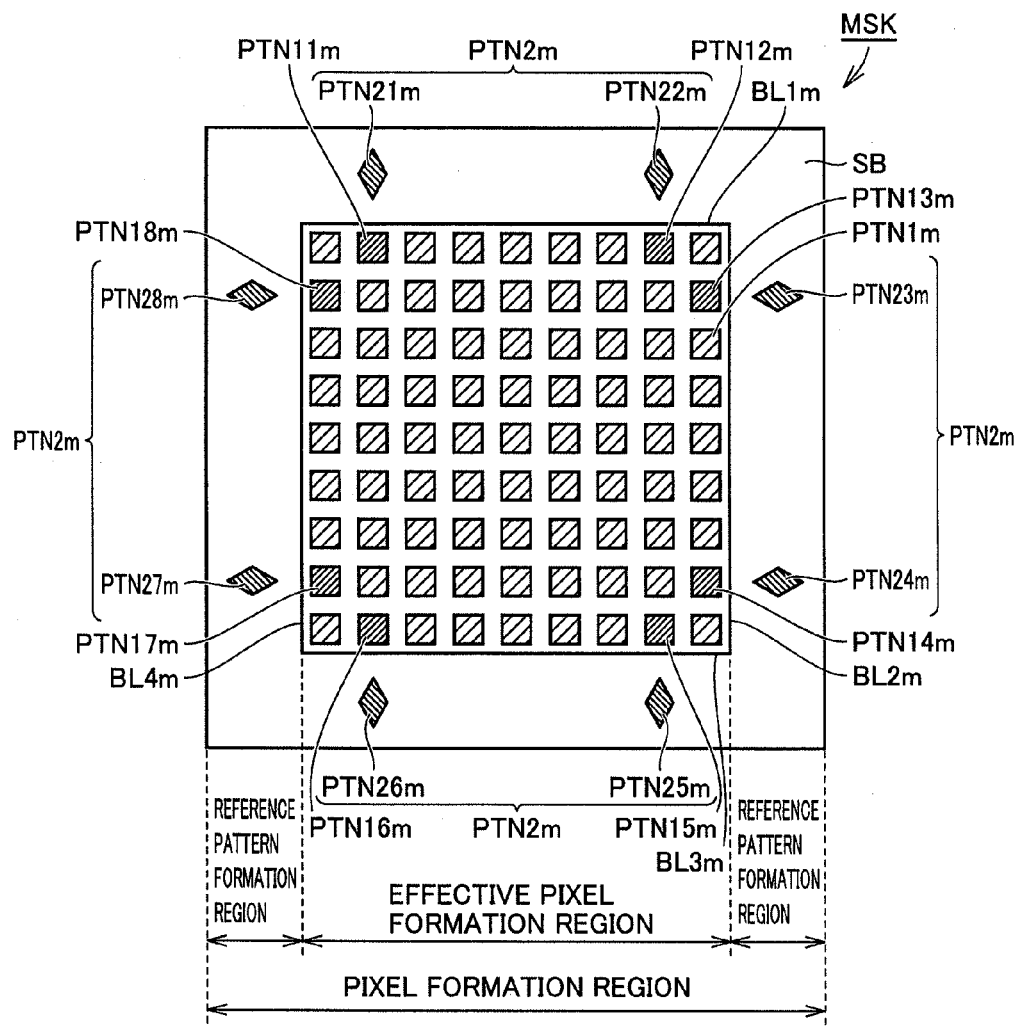
FIG. 6 is a schematic plan view of a second example of the mask according to the second embodiment.

In FIGS. 5 and 6, shrink of pixel pattern PTN11m in the effective pixel formation region and positional displacement in the effective pixel formation region are not taken into consideration. Actually, however, referring to FIG. 7, similarly to the first embodiment, pixel patterns PTN1m as a whole are arranged to be displaced from non-pixel patterns PTN2m toward the center side (to be concentrated on the center side) of the effective pixel formation region in the present embodiment as well.

Figure 7:
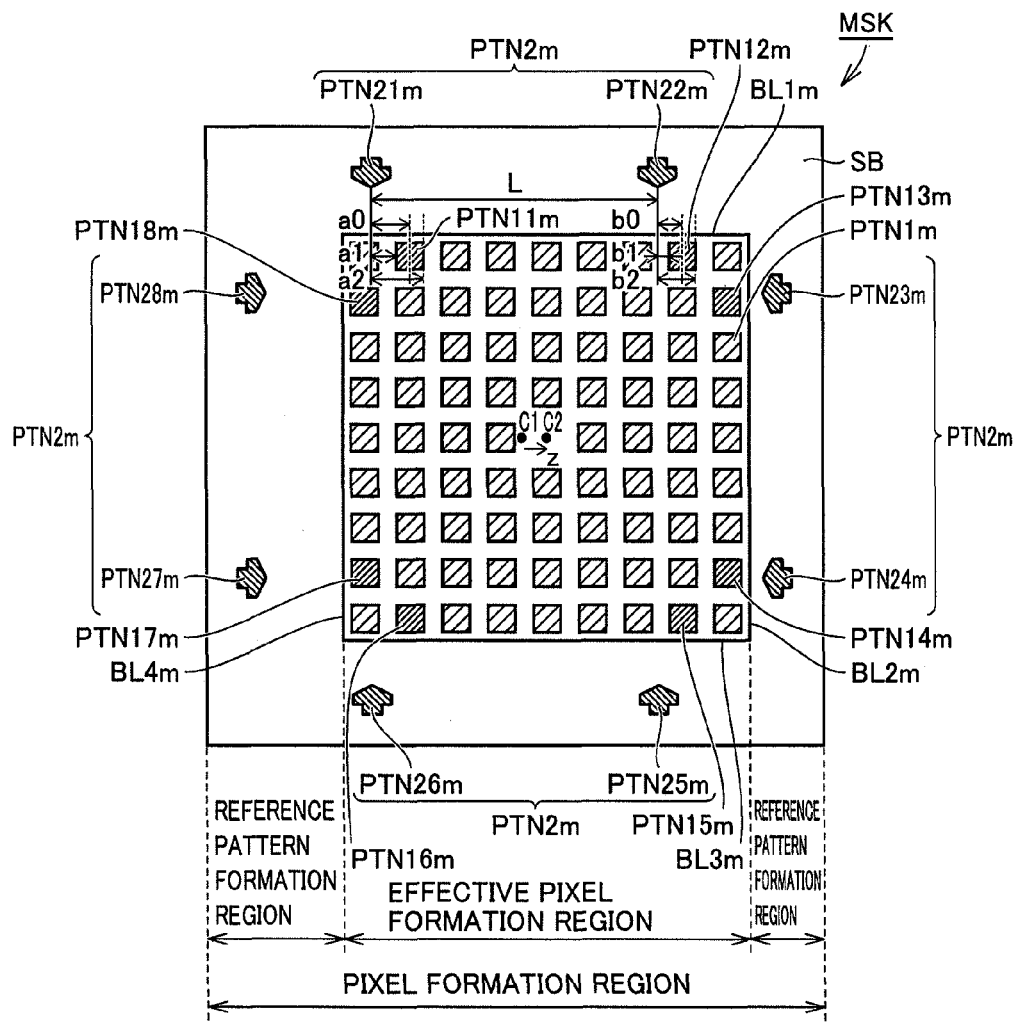
FIG. 7 is a schematic plan view for describing positional displacement of an effective pixel formation region from a reference pattern formation region of the mask according to the second embodiment (FIG. 5).

Actually, shrink and positional displacement shown in FIG. 7 exist also in rhombic reference patterns PTN21m to PTN28m in FIG. 6, although this is not shown.

Assume that L represents a distance between a central portion (imaginary straight line 1) of reference pattern PTN21m and a central portion (imaginary straight line 1) of reference pattern PTN22m in the horizontal direction in the figure. At this time, assuming that S represents a shrink rate, a distance a0 between the central portion of reference pattern PTN21m and a central portion of pixel pattern PTN11m is expressed by the following equation:

$$a0 = \frac{a1 + a2}{2}. \tag{5}$$

A distance b0 between the central portion of reference pattern PTN22m and a central portion of pixel pattern PTN12m is expressed by the following equation:

$$b0 = \frac{b1 + b2}{2}. \tag{6}$$

In the aforementioned equations, a1 represents a distance between the central portion of reference pattern PTN21m and an edge of pixel pattern PTN11m, and b1 represents a distance between the central portion of reference pattern PTN22m and an edge of pixel pattern PTN12m.

In FIGS. 5 to 7, dummy formation pattern DMm is not arranged. However, referring to FIG. 8, similarly to the first embodiment, dummy formation patterns DMm may be arranged to surround each of reference patterns PTN21m to PTN28m in the present embodiment as well.

Figure 9:
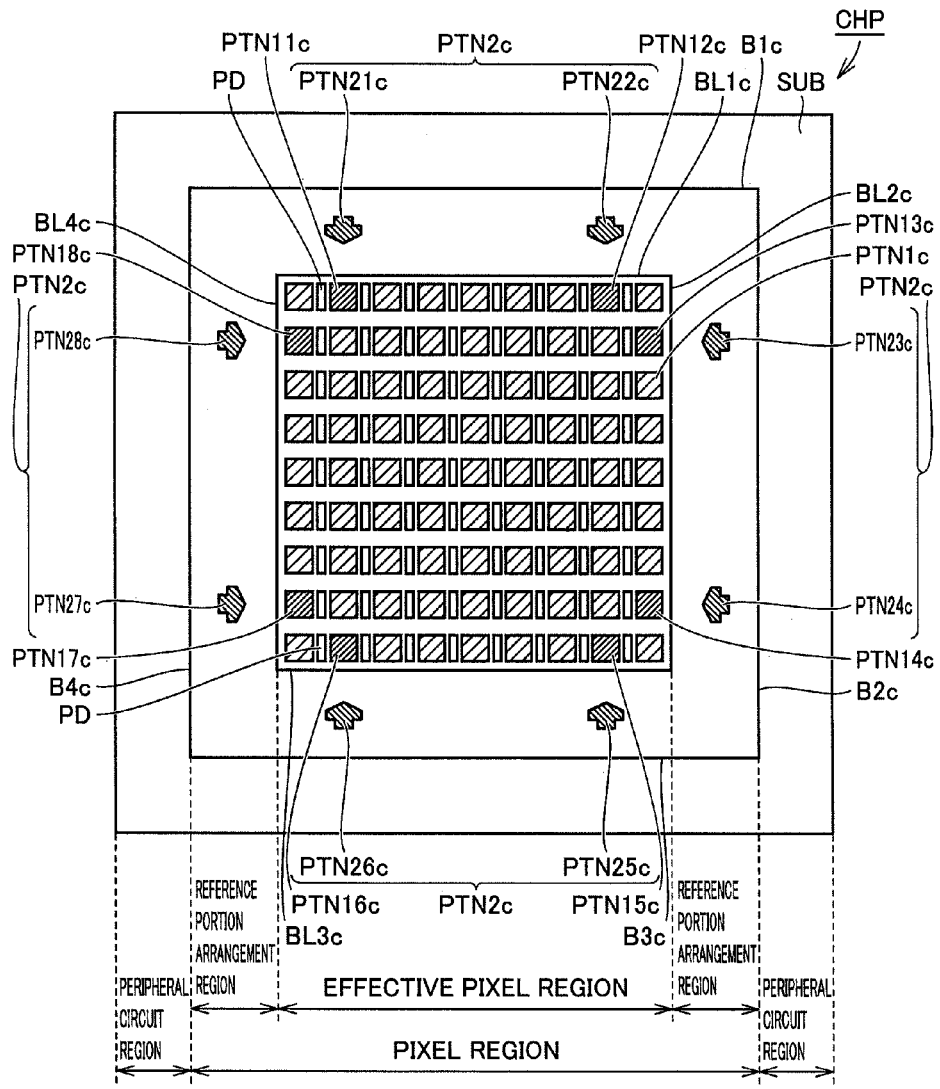
FIG. 9 is a schematic plan view of a semiconductor chip formed by using the mask according to the second embodiment (FIG. 5).

Referring to FIG. 9, semiconductor chip CHP according to the present embodiment formed by using mask MSK in FIG. 5 has a configuration basically similar to that of semiconductor chip CHP according to the first embodiment. However, in semiconductor chip CHP in FIG. 9, non-pixel component PTN2c (reference portions PTN21c to PTN28c) arranged in the reference portion arrangement region has an arrow-like (wedge-like) planar shape. Since semiconductor chip CHP in FIG. 9 is formed by using mask MSK in FIG. 5, pixel component PTN1c and non-pixel component PTN2c have a configuration basically similar to that of pixel pattern PTN1m and non-pixel pattern PTN2m. Semiconductor chip CHP according to the present embodiment may, for example, have rhombic non-pixel component PTN2c (reference portions PTN21c to PTN28c) formed by using mask MSK in FIG. 6.

Next, the function and effect of the present embodiment will be described.

Non-pixel pattern PTN2m of mask MSK according to the present embodiment has a planar shape that is symmetric with respect to imaginary straight line 1 as a symmetric line extending perpendicularly to each of boundary lines BL1m to BL4m. In other words, in non-pixel pattern PTN2m, the pattern is arranged over the same distance on both of the right and left sides of imaginary straight line 1 in the direction perpendicular to imaginary straight line 1. Therefore, in non-pixel pattern PTN2m in the present embodiment, the optical proximity effect and the micro-loading effect affect both of the right and left sides of imaginary straight line 1 in substantially the same manner. Therefore, in non-pixel pattern PTN2m in the present embodiment, deformation and the like caused by the optical proximity effect and the micro-loading effect occur in the opposite directions in both of the right and left sides of imaginary straight line 1.

Therefore, even if the shape changes due to the optical proximity effect and the like on the right and left sides of imaginary straight line 1 of non-pixel pattern PTN2*m*, the change in shape on the left side of imaginary straight line 1 and the change in shape on the right side of imaginary straight line 1 are canceled out and the change in shape and position does not occur in imaginary straight line 1 that is the central portion of non-pixel pattern PTN2*m*. In other words, at least imaginary straight line 1 is secured at a desired position, and thereby, a position of a tip (pointed portion) of wedge-shaped non-pixel pattern PTN2*m* shown in FIG. 5 and rhombic non-pixel pattern PTN2*m* shown in FIG. 6, for example, has high reliability as the reference position. By using this position, the positional displacement of pixel patterns PTN11*m* to PTN18*m* from reference patterns PTN21*m* to PTN28*m* can be measured with a high degree of accuracy.

Figure 8:
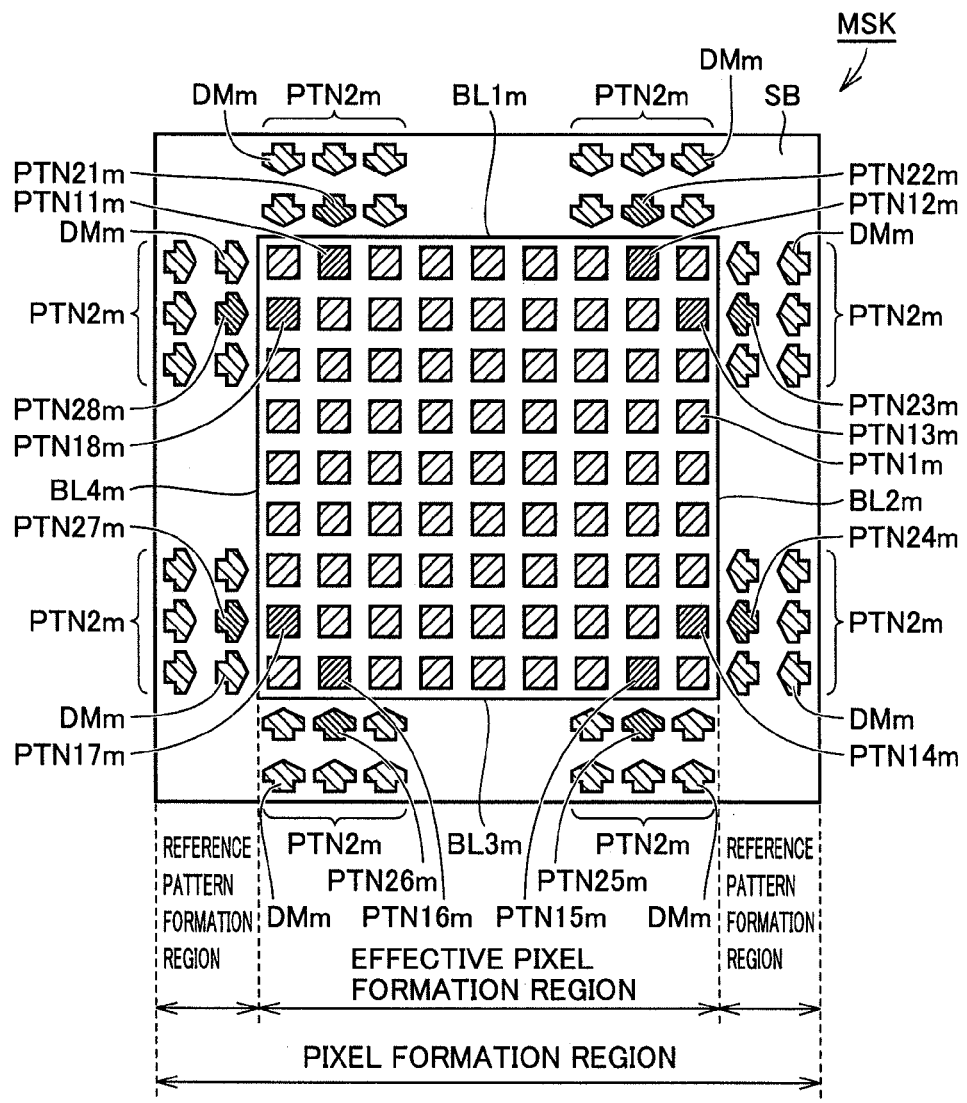
FIG. 8 is a schematic plan view of a third example of the mask according to the second embodiment.

As described above, in the present embodiment, at least the position of non-pixel pattern PTN2*m* on imaginary straight line 1 may only be secured, and there is no problem even if deformation and the like occur in non-pixel pattern PTN2*m* in a region other than the region on imaginary straight line 1. Therefore, as shown in FIG. 5 and the like, dummy formation pattern DMm does not need to be arranged for a group of non-pixel pattern PTN2*m* in the present embodiment. However, when the group of non-pixel pattern PTN2*m* in the present embodiment is formed by one reference pattern PTN21*m* to PTN28*m* and a plurality of (in the present embodiment, five) dummy formation patterns DMm as shown in FIG. 8, similarly to the first embodiment, deformation of reference pattern PTN21*m* can be suppressed, and thus, the reference position can be indicated with a higher degree of accuracy.

In addition, because of the configuration similar to that of aforementioned mask MSK in semiconductor chip CHP, the function and effect similar to those of aforementioned mask MSK are produced.

(Third Embodiment)

A first method for manufacturing mask MSK according to the first and second embodiments is as described below. In particular, a design (layout) method on a CAD will now be described.

Figure 10:
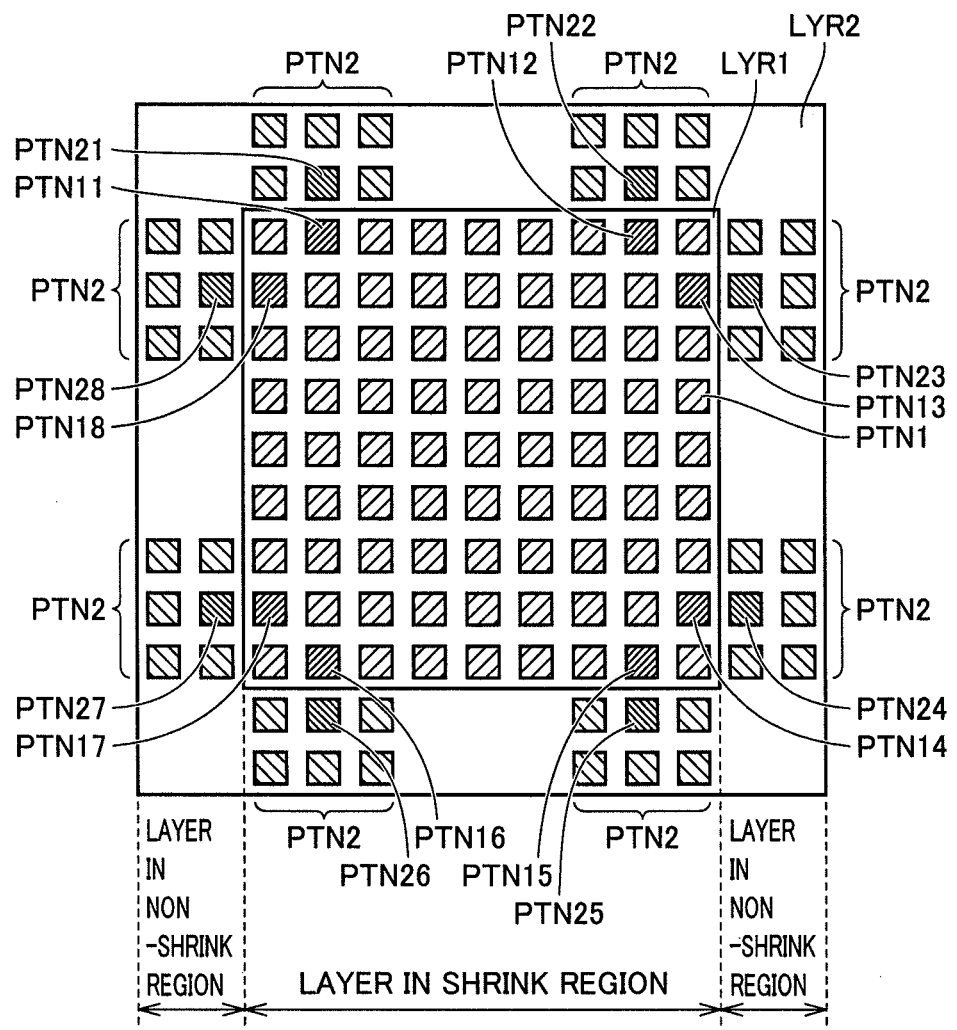
FIG. 10 is a schematic plan view for describing layers for forming the mask according to the first embodiment, which are used in a manufacturing method according to a third embodiment.
Figure 11:
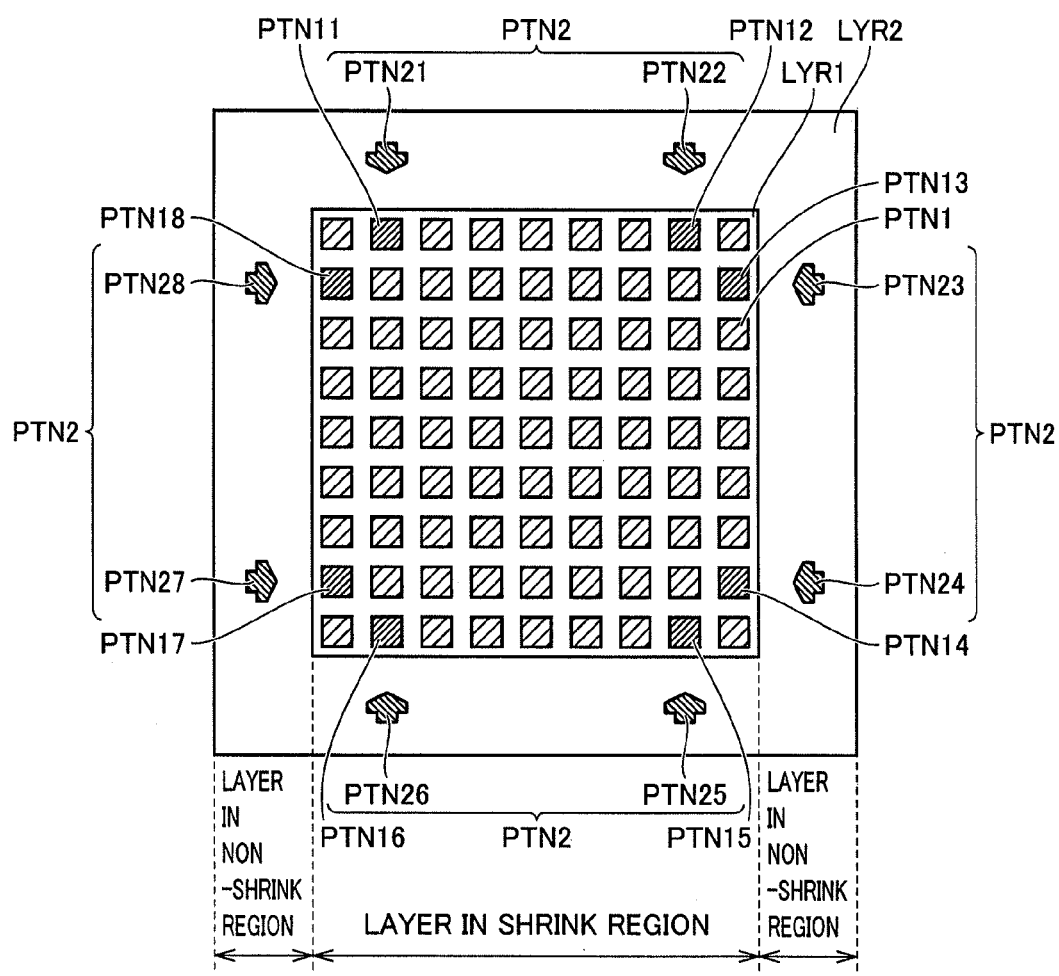
FIG. 11 is a schematic plan view for describing layers for forming the mask according to the second embodiment, which are used in the manufacturing method according to the third embodiment.

Referring to FIGS. 10 and 11, in the present embodiment, a layer that is a collection of data on the CAD for forming the effective pixel formation region (and the pattern thereof) on mask MSK and a layer on the CAD for forming the reference pattern formation region (and the pattern thereof) on mask MSK are prepared separately.

In other words, the layer for forming the effective pixel formation region corresponds to a layer LYR1 in a shrink region, and the layer for forming the reference pattern formation region corresponds to a layer LYR2 in a non-shrink region. This is because pixel pattern PTN1*m* formed in the effective pixel formation region is shrunk, whereas non-pixel pattern PTN2*m* formed in the reference pattern formation region is not shrunk.

The layer in the shrink region includes pixel data PTN1 for forming pixel pattern PTN1*m* (including pixel patterns PTN11*m* to PTN18*m*), and pixel data PTN1 includes pixel data PTN11 to PTN18. Pixel data PTN11 to PTN18 correspond to data for forming pixel patterns PTN11*m* to PTN18*m*, respectively.

The layer in the non-shrink region includes non-pixel pattern PTN2*m*, i.e., reference patterns PTN21*m* to PTN28*m*, and non-pixel data PTN2 for forming dummy formation pattern DMm, and non-pixel data PTN2 includes data for forming reference data PTN21 to PTN28 and dummy formation pattern DMm. Reference data PTN21 to PTN28 correspond to data for forming reference patterns PTN21*m* to PTN28*m*, respectively.

Both of mask MSK in FIG. 1 (first embodiment) as shown in FIG. 10 and mask MSK in FIG. 5 (second embodiment) as shown in FIG. 11 can be formed by using the two layers of the layer in the shrink region and the layer in the non-shrink region as in the present embodiment.

In order to facilitate imagining the collection of data existing on layers LYR1 and LYR2, each data is shown to be arranged in rows and columns similarly to mask MSK and the like.

Next, the method for manufacturing mask MSK according to the present embodiment (design method using the CAD) will be described with reference to FIG. 12.

Figure 12:
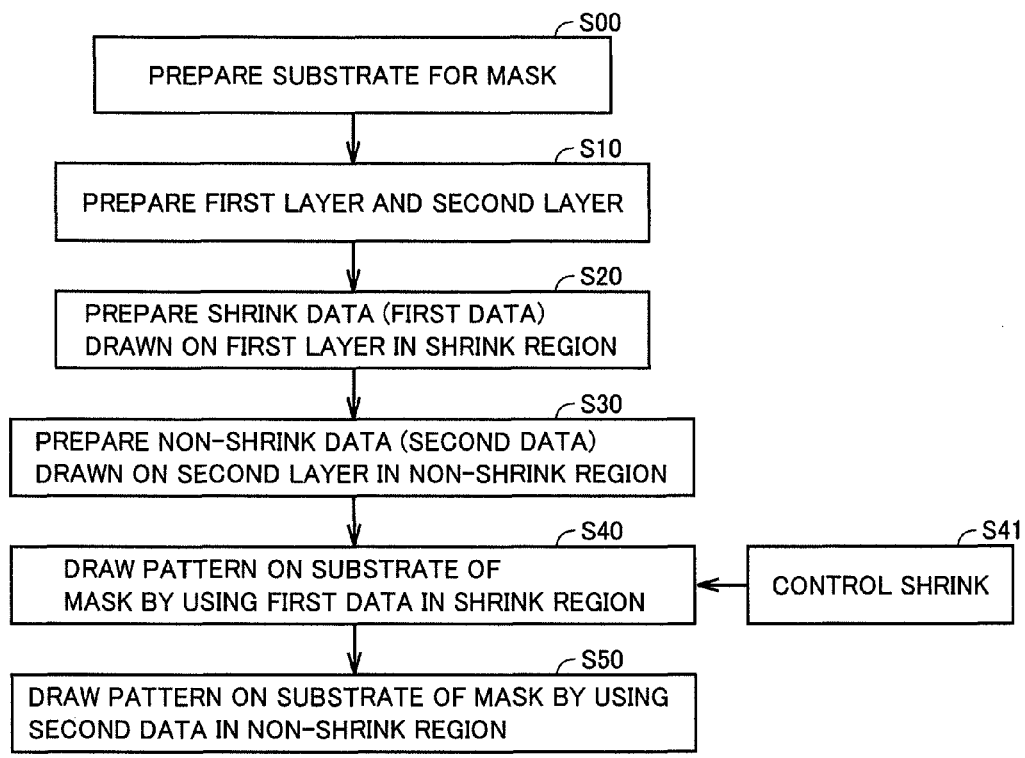
FIG. 12 is a flowchart for describing the manufacturing method according to the third embodiment.

Referring to FIG. 12, substrate SB for the mask is first prepared (S00). Next, prepared are a first layer where the data (first data) in the shrink region can collect, and a second layer where the data (second data) in the non-shrink region can collect, as shown in FIGS. 10 and 11 (S10).

Next, drawn on the first layer is shrink data PTN1 (first data) for drawing pixel pattern PTN1*m* in the effective pixel formation region where pixel pattern PTN1*m* for forming pixel component PTN1*c* (refer to FIGS. 3 and 9) is formed (S20).

Next, drawn on the second layer is non-shrink data PTN2 (second data) for drawing reference patterns PTN21*m* to PTN28*m* in the reference pattern formation region where reference patterns PTN21*m* to PTN28*m* (for forming reference portions PTN21*c* to PTN28*c*) are formed, reference patterns PTN21*m* to PTN28*m* being for indicating the reference position where pixel pattern PTN1*m* should be arranged (S30).

To put it more briefly, first data PTN1 (PTN11 to PTN18) that is the data in the shrink region is drawn on the first layer that is the layer in the shrink region, and second data PTN2 (PTN21 to PTN28) that is the data in the non-shrink region is drawn on the second layer that is the layer in the non-shrink region. Second data PTN2 herein includes the data for forming dummy formation pattern DMm.

The order of the step (S20) and the step (S30) does not matter. The step (S30) may be performed prior to the step (S20), or the step (S20) and the step (S30) may be performed simultaneously.

Next, by using the first data that is the data in the shrink region, pixel pattern PTN1*m* (PTN11*m* to PTN18*m*) is drawn on substrate SB of the mask (S40). At this time, pixel pattern PTN1*m* is controlled to shrink to be displaced toward the center side of the effective pixel formation region from the position where pixel pattern PTN1*m* should be arranged in the case of no shrink (S41).

Next, by using the second data that is the data in the non-shrink region, non-pixel pattern PTN2*m* (reference patterns PTN21*m* to PTN28*m* and dummy formation pattern DMm) is drawn on substrate SB of the mask (S50). Drawing herein is easily performed in accordance with an ordinary method such that the reference position can be indicated without shrink.

The order of the step (S40) and the step (S50) does not matter. The step (S50) may be performed prior to the step (S40), or the step (S40) and the step (S50) may be performed simultaneously.

The data in the shrink region and the data in the non-shrink region are drawn on the different layers as in the present embodiment, and thereby, only the data in the shrink region can be shrunk with respect to the data in the non-shrink region during actual drawing on substrate SB of mask MSK. In addition, the data in the non-shrink region can be drawn to indicate the ordinary reference position, and thus, easy formation can be achieved without using a special method. Therefore, there can be provided high-accuracy mask MSK described in the first and second embodiments.

(Fourth Embodiment)

A second method for manufacturing mask MSK according to the first and second embodiments is as described below. Here as well, a design (layout) method on the CAD, in particular, will be described.

Figure 13:
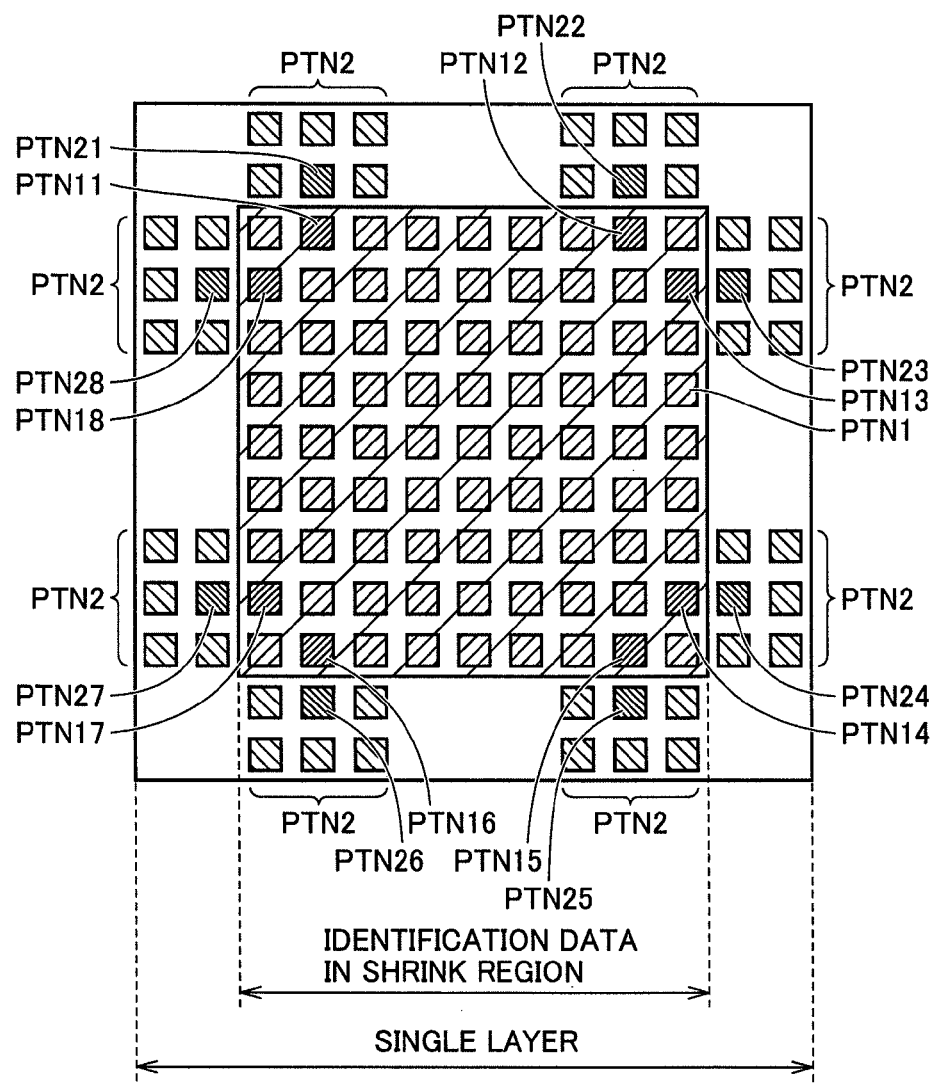
FIG. 13 is a schematic plan view for describing layers for forming the mask according to the first embodiment, which are used in a manufacturing method according to a fourth embodiment.
Figure 14:
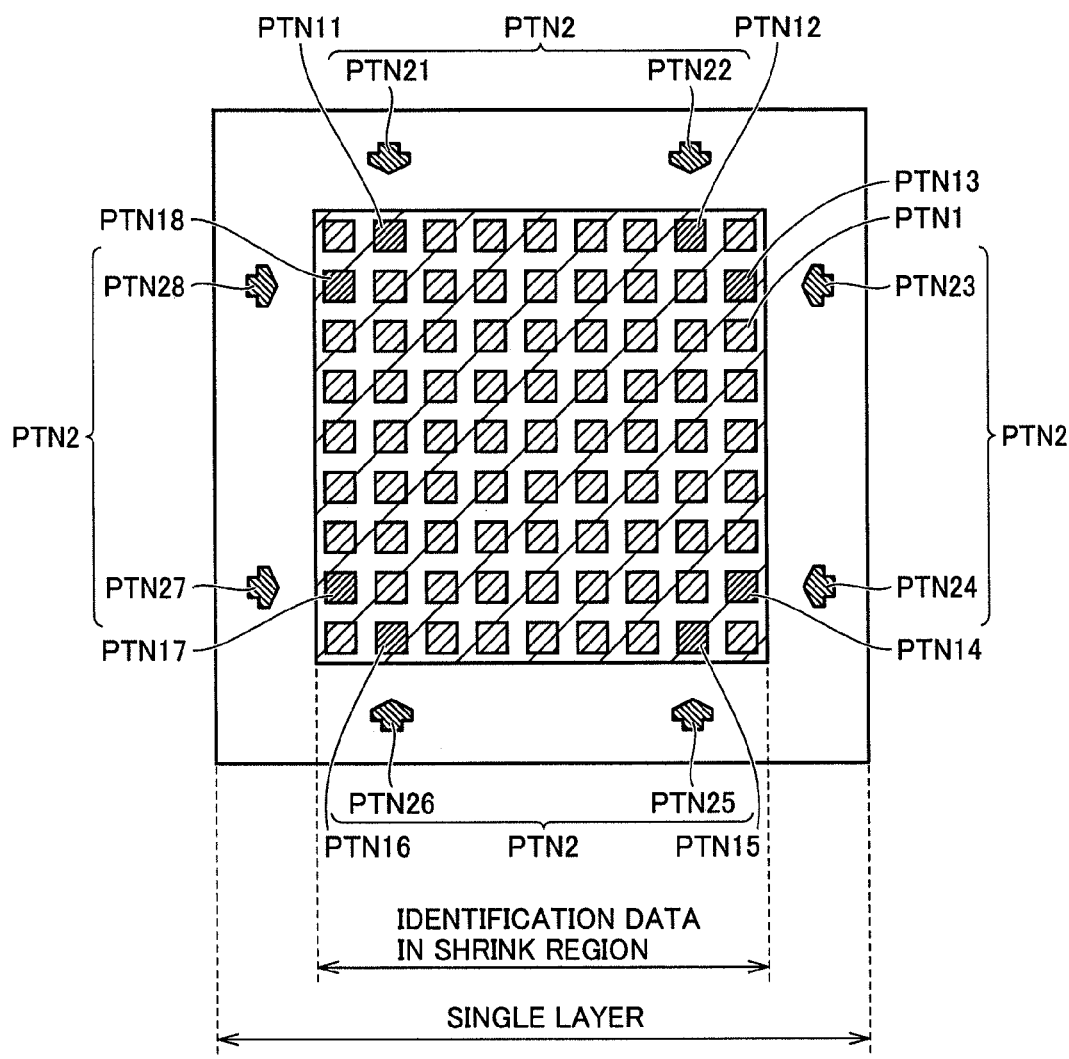
FIG. 14 is a schematic plan view for describing layers for forming the mask according to the second embodiment, which are used in the manufacturing method according to the fourth embodiment.

Referring to FIGS. 13 and 14, in the present embodiment, the data for forming pixel pattern PTN1$m$ in the effective pixel formation region and the data for forming non-pixel pattern PTN2$m$ in the reference pattern formation region are present in a single layer, for example. However, superimposed only on, for example, the data for forming pixel pattern PTN1$m$, of these data, is identification data indicating that this data should be shrunk and formed on substrate SB of mask MSK. Due to the presence of this identification data, only the data in the shrink region is controlled and drawn to shrink with respect to the data in the non-shrink region when patterns PTN1$m$ and PTN2$m$ are actually drawn on substrate SB.

The present embodiment is different from the aforementioned third embodiment in terms of the aforementioned point. The remaining components and the like are similar to those in the third embodiment, and thus, description thereof will not be repeated.

Next, the method for manufacturing mask MSK according to the present embodiment (design method using the CAD) will be described with reference to FIG. 15.

Figure 15:
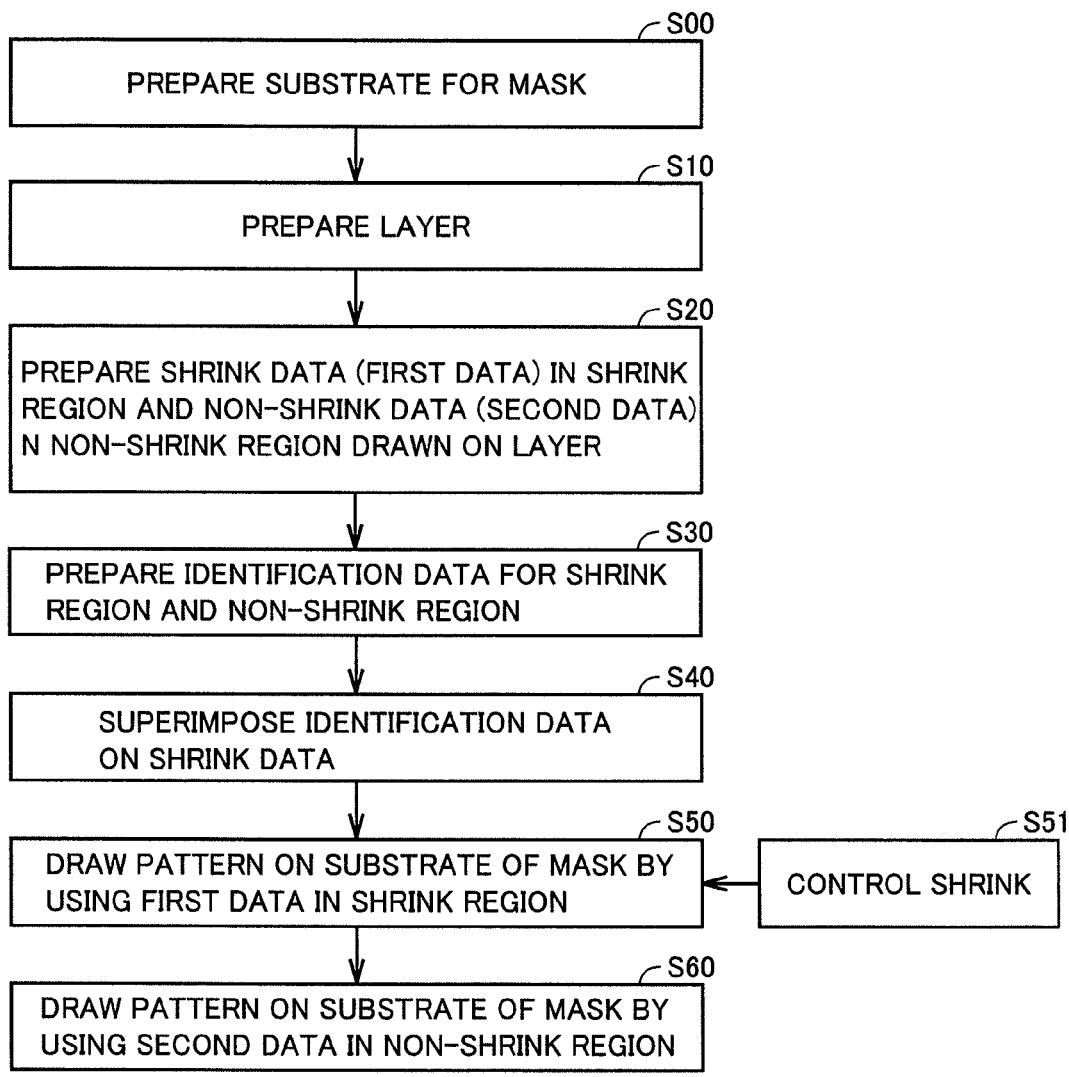
FIG. 15 is a flowchart for describing the manufacturing method according to the fourth embodiment.

Referring to FIG. 15, substrate SB for the mask is first prepared (S00).

Next, as shown in FIGS. 13 and 14, prepared is, for example, a single layer where the first data for drawing pixel pattern PTN1$m$ in the effective pixel formation region (shrink region) and the second data for drawing non-pixel pattern PTN2$m$ in the reference pattern formation region (non-shrink region) are drawn (S10).

Next, the aforementioned first data and second data drawn on the layer prepared in the step (S10) are prepared (S20).

Next, prepared is the identification data for distinguishing between the first data for drawing pixel pattern PTN1$m$ in the effective pixel formation region (shrink region) and the second data for drawing non-pixel pattern PTN2$m$ in the reference pattern formation region (non-shrink region) (S30). The identification data specifically refers to the data superimposed only on the first data, for example. By using the identification data, the data having the identification data superimposed thereon can be identified as the first data, and the data not having the identification data superimposed thereon can be identified as the second data. Conversely, the identification data superimposed only on the second data may be prepared. In this case, the data having the identification data superimposed thereon can be identified as the second data, and the data not having the identification data superimposed thereon can be identified as the first data. In the following description, it is assumed that the identification data is superimposed on the first data.

Next, the identification data prepared in the step (S30) is superimposed only on the first data in the shrink region (S40). In other words, the identification data is drawn to overlap with the first data. As a result, even when the first data and the second data are present, the data having the identification data superimposed thereon can be easily identified as the first data, and the data not having the identification data superimposed thereon can be easily identified as the second data.

Next, with the identification data superimposed only on the first data, pixel pattern PTN1$m$ (PTN11$m$ to PTN18$m$) is drawn on substrate SB of the mask similarly to the step (S40) in FIG. 12 (S50). At this time, pixel pattern PTN1$m$ is controlled to shrink similarly to the step (S41) in FIG. 12 (S51).

Next, by using the second data that is the data in the non-shrink region, non-pixel pattern PTN2$m$ (reference patterns PTN21$m$ to PTN28$m$ and dummy formation pattern DM$m$) is drawn on substrate SB of the mask similarly to the step (S50) in FIG. 12 (S60).

Here as well, the order of the step (S50) and the step (S60) does not matter. The step (S60) may be performed prior to the step (S50), or the step (S50) and the step (S60) may be performed simultaneously.

As in the present embodiment, the identification data for distinguishing between the data in the shrink region and the data in the non-shrink region is superimposed on the data in the shrink region. By doing this, only the data in the shrink region can be shrunk with respect to the data in the non-shrink region during actual drawing on substrate SB of mask MSK, even when the data in the shrink region and the data in the non-shrink region are drawn on the same layer. As a result, there can be provided high-accuracy mask MSK described in the first and second embodiments.

(Fifth Embodiment)

A third method for manufacturing mask MSK according to the first and second embodiments is as described below. Here as well, a design (layout) method on the CAD, in particular, will be described.

Figure 16:
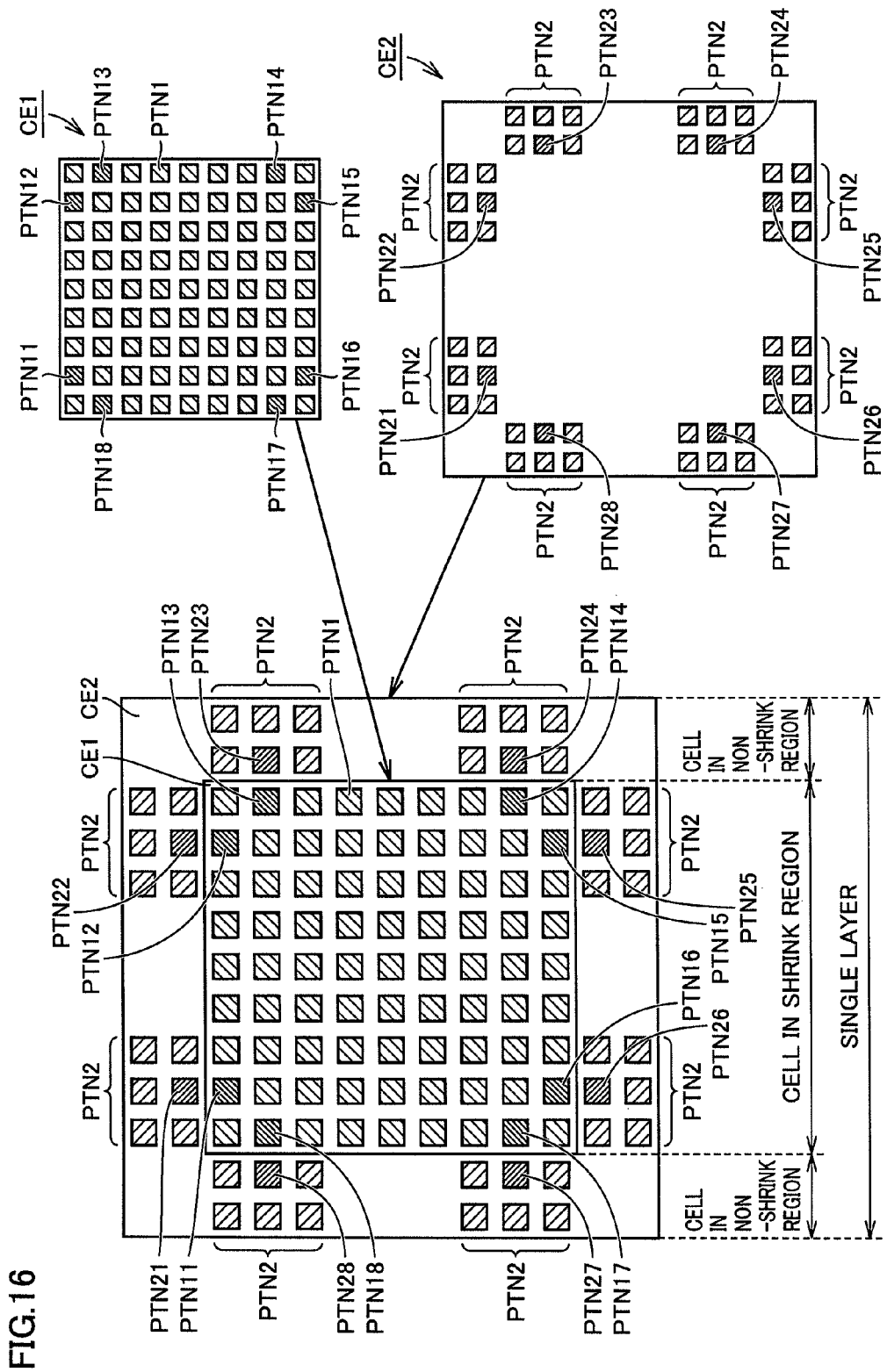
FIG. 16 is a schematic plan view for describing cells for forming the mask according to the first embodiment, which are used in a manufacturing method according to a fifth embodiment.

Referring to FIGS. 15 and 16, in the present embodiment, two cells of a first cell CE1 and a second cell CE2 are included in a single layer, for example. The first cell includes the data (pixel data PTN1) for drawing pixel pattern PTN1$m$ in the effective pixel formation region (shrink region), and the second cell includes the data (non-pixel data PTN2) for drawing reference pattern PTN2$m$ in the reference pattern formation region (non-shrink region).

In other words, the cell for forming the effective pixel formation region corresponds to cell CE1 in the shrink region, and the cell for forming the reference pattern formation region corresponds to cell CE2 in the non-shrink region.

As described above, in the present embodiment, the cells, each of which is a unit of a collection of smaller data, are included in the layer that is a collection of data on the CAD.

The present embodiment is different from the aforementioned third embodiment in terms of the aforementioned point. The remaining components and the like are similar to those in the third embodiment, and thus, description thereof will not be repeated.

Next, the method for manufacturing mask MSK according to the present embodiment (design method using the CAD) will be described with reference to FIG. 18.

Figure 18:
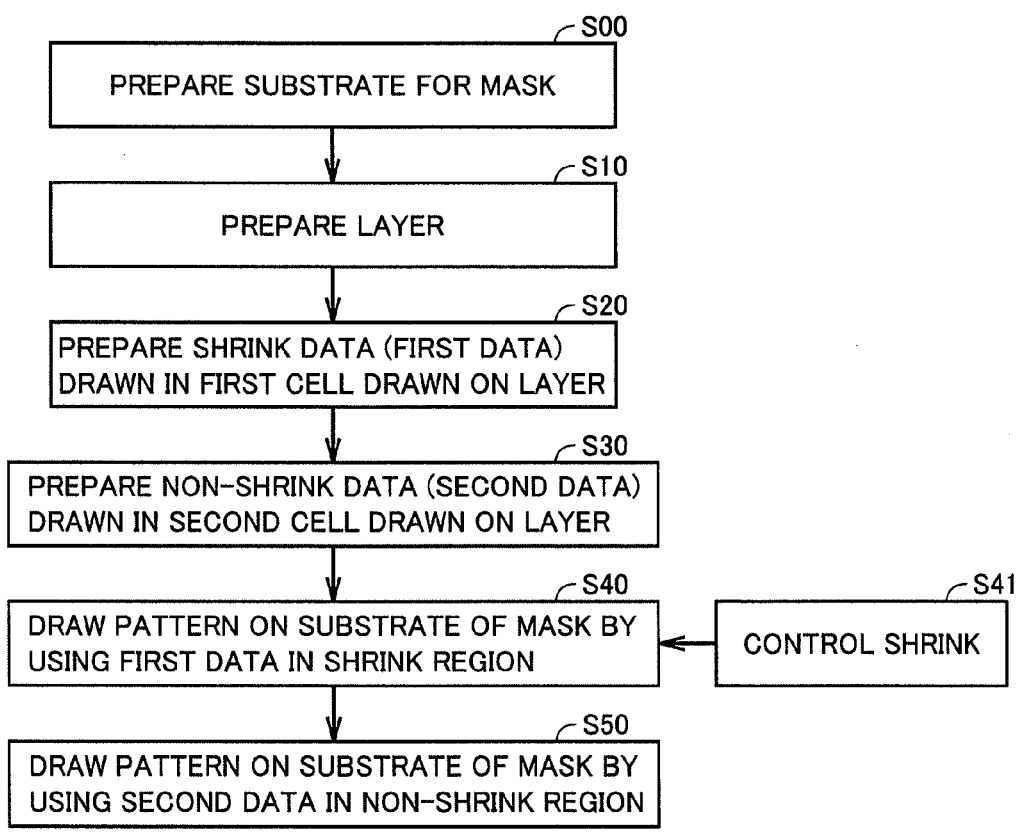
FIG. 18 is a flowchart for describing the manufacturing method according to the fifth embodiment.

Referring to FIG. 18, substrate SB for the mask is first prepared (S00).

Figure 17:
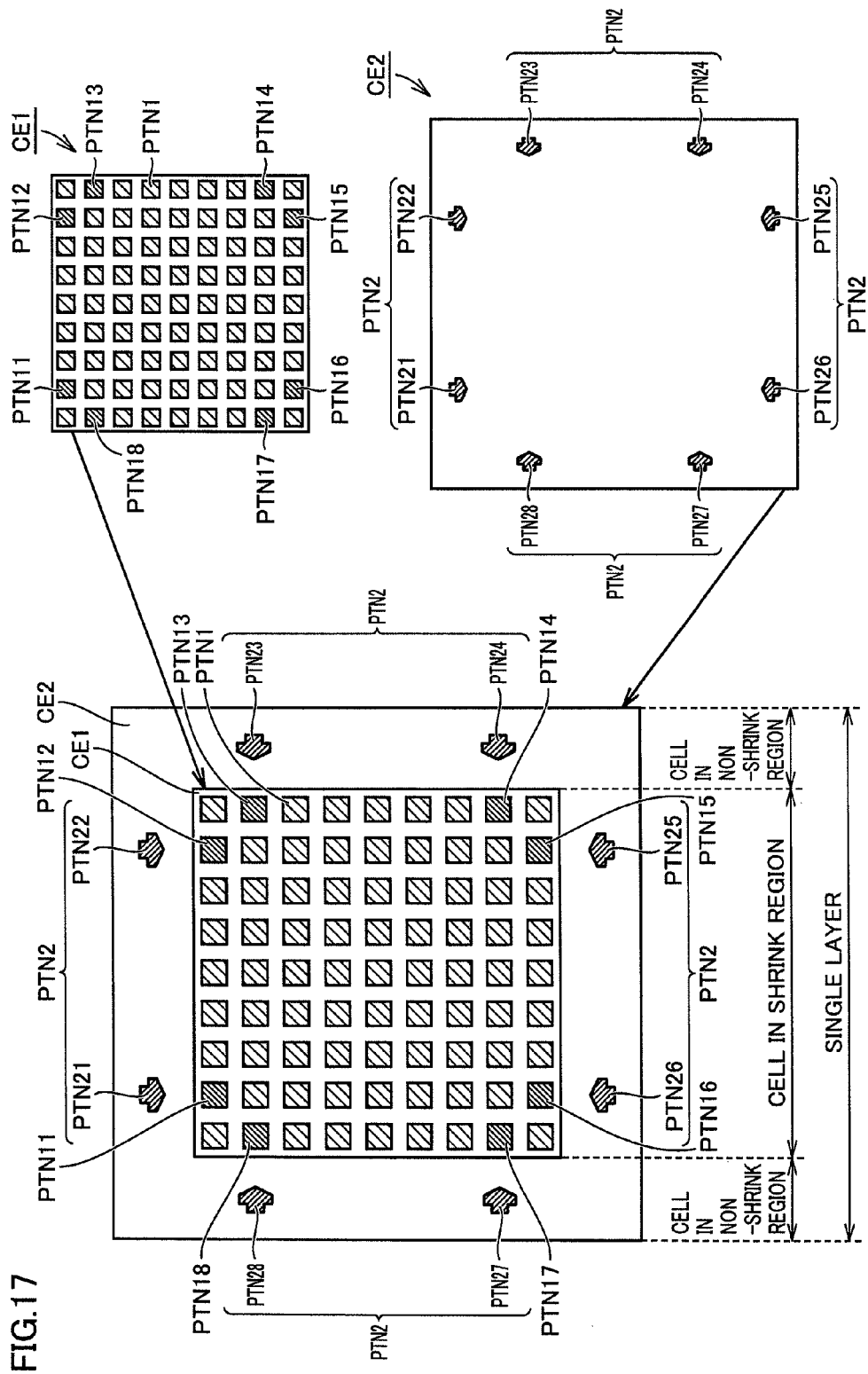
FIG. 17 is a schematic plan view for describing cells for forming the mask according to the second embodiment, which are used in the manufacturing method according to the fifth embodiment.

Next, as shown in FIGS. 16 and 17, prepared is, for example, a single layer where the first data for drawing pixel pattern PTN1$m$ in the effective pixel formation region (shrink region) and the second data for drawing reference pattern PTN2$m$ in the reference pattern formation region (non-shrink region) are drawn (S10). This step is similar to the step (S10) in FIG. 15.

Next, first cell CE1 as the cell in the effective pixel formation region (shrink region) and second cell CE2 as the cell in the reference pattern formation region (non-shrink region) are drawn on the aforementioned layer. The first data for drawing pixel pattern PTN1*m* in the effective pixel formation region (shrink region) is drawn in cell CE1 in the shrink region (S20).

The second data for drawing non-pixel pattern PTN2*m* in the reference pattern formation region (non-shrink region) is drawn in cell CE2 in the non-shrink region (S30).

Then, drawing on the substrate of the mask is performed by the process similar to the steps (S40), (S41) and (S50) in the third embodiment (FIG. 12), for example (S40 to S50).

Even when the data in the shrink region and the data in the non-shrink region are drawn in the different cells in the same layer as in the present embodiment, the effect is produced similarly to the effect produced when the data in the shrink region and the data in the non-shrink region are drawn on the different layers as in the third embodiment, for example. In other words, only the data in the shrink region can be shrunk with respect to the data in the non-shrink region during actual drawing on substrate SB of mask MSK, and there can be provided high-accuracy mask MSK described in the first and second embodiments.

By applying the present embodiment, the data for recognizing the shrink region or the non-shrink region is superimposed on the data in the layer in the fourth embodiment, for example. Instead of this, the data for recognizing the shrink region or the non-shrink region may be superimposed on the data in the single cell.

(Sixth Embodiment)

A fourth method for manufacturing mask MSK according to the first and second embodiments is as described below. Here as well, a design (layout) method on the CAD, in particular, will be described.

Figure 19:
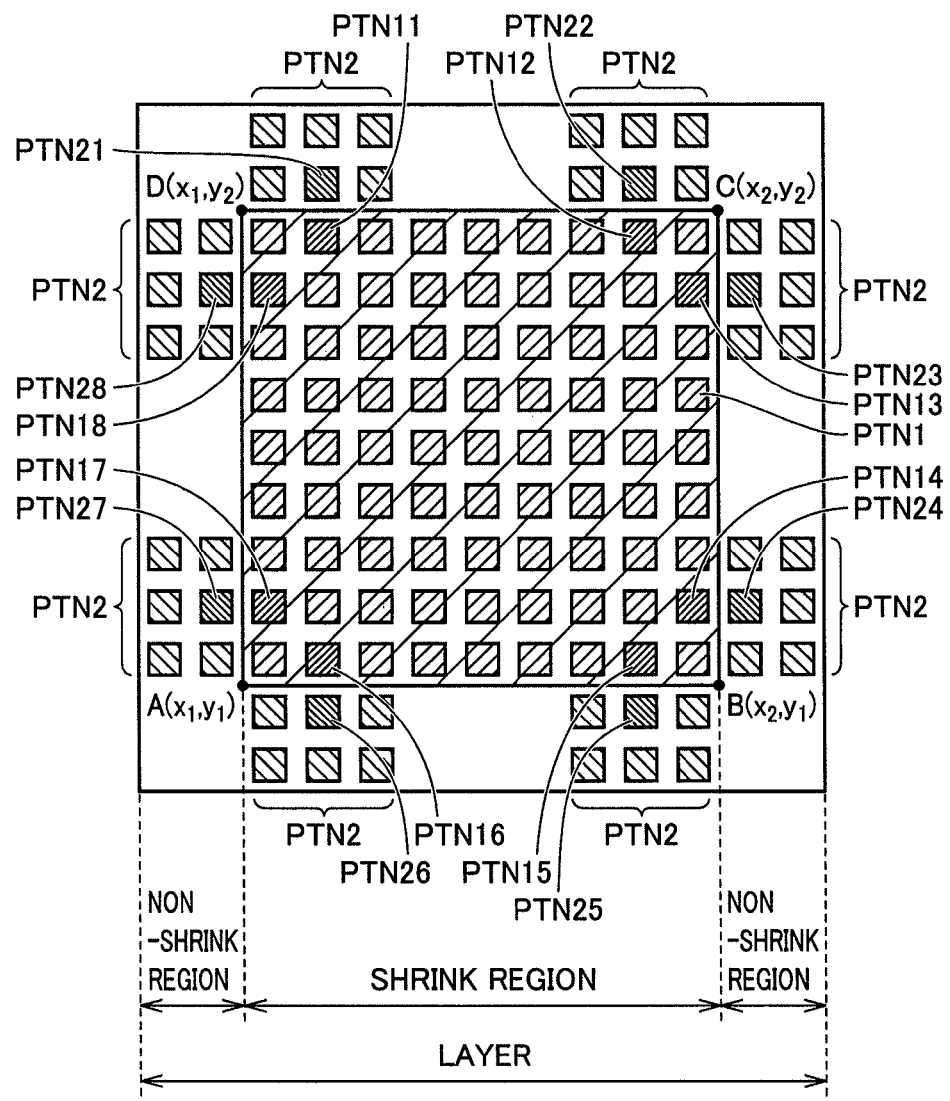
FIG. 19 is a schematic plan view for describing layers for forming the mask according to the first embodiment, which are used in a manufacturing method according to a sixth embodiment.
Figure 20:
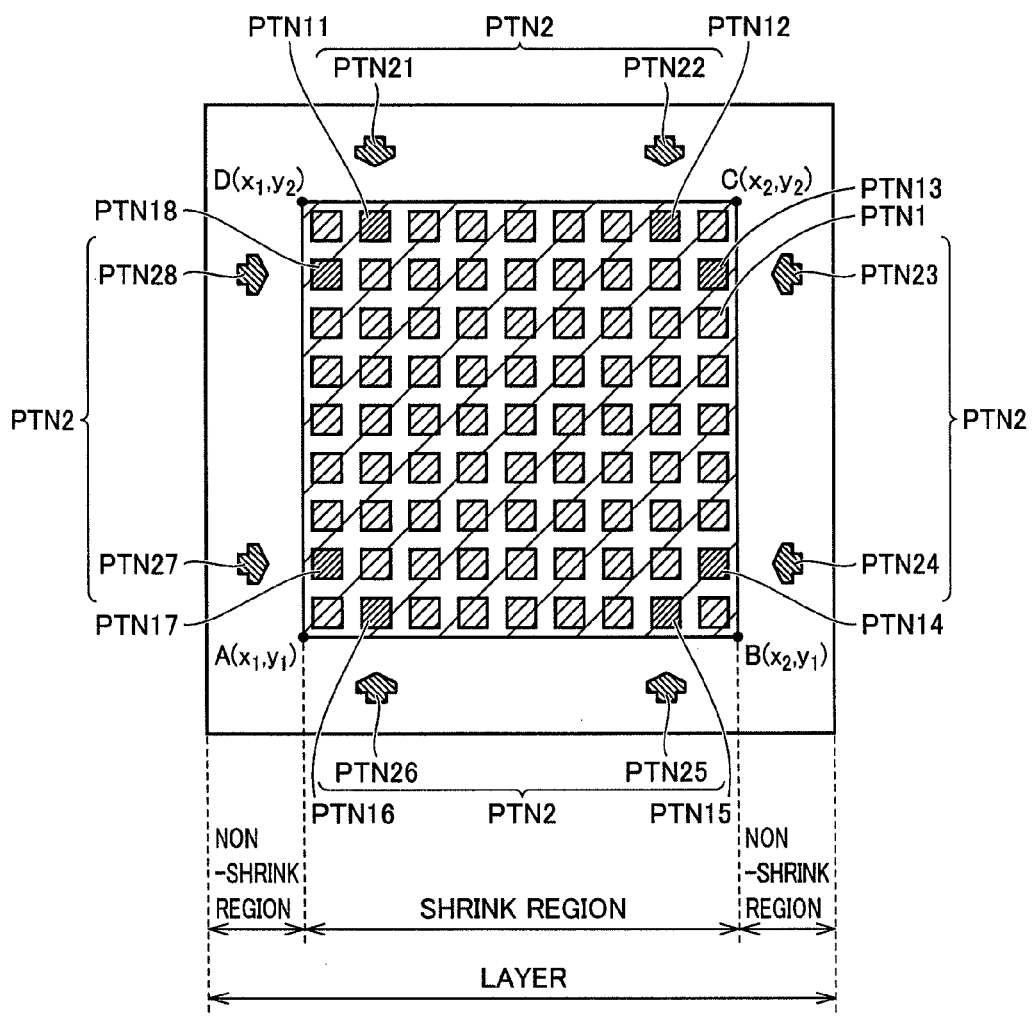
FIG. 20 is a schematic plan view for describing layers for forming the mask according to the second embodiment, which are used in the manufacturing method according to the sixth embodiment.

Referring to FIGS. 19 and 20, in the present embodiment, the data for forming pixel pattern PTN1*m* in the effective pixel formation region and the data for forming non-pixel pattern PTN2*m* in the reference pattern formation region are present in a single layer, for example. A coordinate of a position where each data should be drawn on substrate SB of mask MSK is determined.

In the present embodiment, the first data (data in the shrink region) for drawing pixel pattern PTN1*m* in the effective pixel formation region and the second data (data in the non-shrink region) for drawing non-pixel pattern PTN2*m* in the reference pattern formation region are distinguished by the coordinate of the position where each data is drawn. Then, only the data in the shrink region is controlled and drawn to shrink with respect to the data in the non-shrink region.

As shown in FIGS. 19 and 20, for example, when the layer is drawn within a coordinate range of $x_1 \leq x \leq x_2$ and $y_1 \leq y \leq y_2$ on mask MSK, the layer is drawn in the shrink region, and thus, the data can be identified as the first data (data in the shrink region). When the layer is drawn outside the aforementioned coordinate range on mask MSK, the data can be identified as the second data (data in the non-shrink region).

In other words, whether the data is the data in the shrink region or not is determined by the identification data superimposed on each data in the fourth embodiment, whereas whether the data is the data in the shrink region or not is determined by identifying the coordinate of the position where each data is drawn in the present embodiment.

The present embodiment is different from the aforementioned fourth embodiment in terms of the aforementioned point. The remaining components and the like are similar to those in the fourth embodiment, and thus, description thereof will not be repeated.

Next, the method for manufacturing mask MSK according to the present embodiment (design method using the CAD) will be described with reference to FIG. 21.

Figure 21:
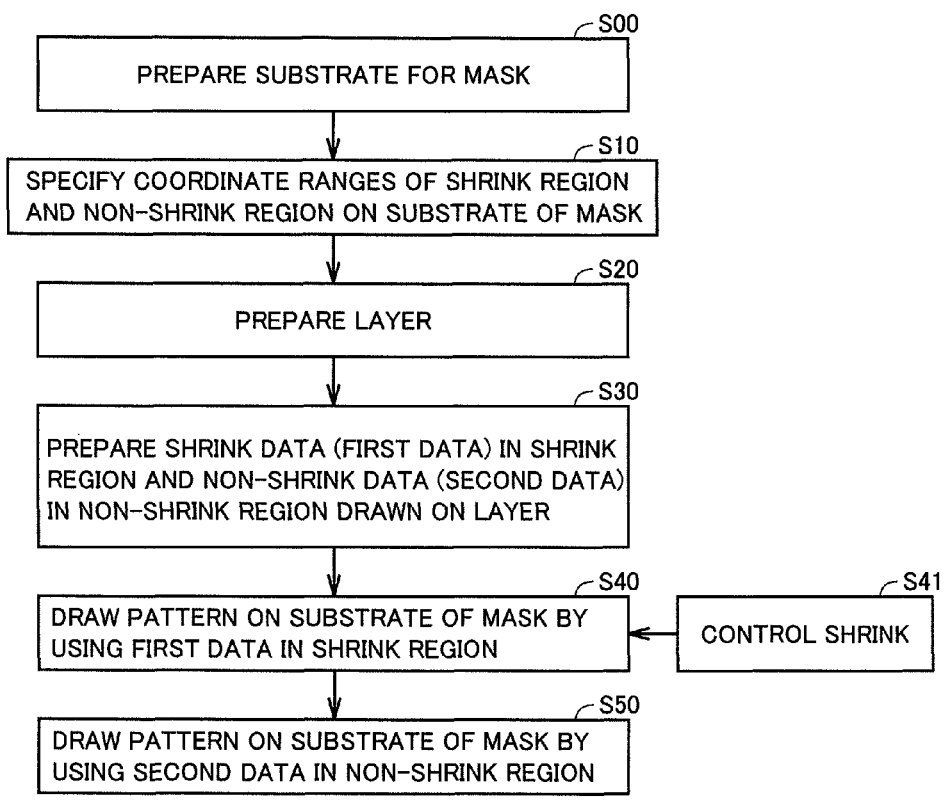
FIG. 21 is a flowchart for describing the manufacturing method according to the sixth embodiment.

Referring to FIG. 21, substrate SB for the mask is first prepared (S00).

Next, as shown in FIG. 21, the coordinate ranges of the effective pixel formation region (shrink region) and the reference pattern formation region (non-shrink region) are specified on substrate SB of the mask (S10). As described above, the region within the coordinate range of $x_1 \leq x \leq x_2$ and $y_1 \leq y \leq y_2$ is specified as the shrink region, and the region within the coordinate range other than the aforementioned coordinate range is specified as the non-shrink region.

Next, prepared is, for example, a single layer where the first data for drawing pixel pattern PTN1*m* in the effective pixel formation region (shrink region) and the second data for drawing non-pixel pattern PTN2*m* in the reference pattern formation region (non-shrink region) are drawn (S20). This step is similar to the step (S10) in FIG. 15.

Next, the aforementioned first data and second data drawn on the layer prepared in the step (S20) are prepared (S30). This step is similar to the step (S20) in FIG. 15.

Then, drawing on the substrate of the mask is performed by the process similar to the steps (S40), (S41) and (S50) in the third embodiment (FIG. 12), for example (S40 to S50). At this time, while identifying the coordinate ranges, it is determined whether the data is the data in the shrink region or the data in the non-shrink region. Then, only the data in the shrink region is shrunk and drawing is performed.

As in the present embodiment, the coordinate ranges of the shrink region and the non-shrink region are specified and identified. By doing this, only the data in the shrink region can also be shrunk with respect to the data in the non-shrink region during actual drawing on substrate SB of mask MSK, similarly to the other embodiments. As a result, there can be provided high-accuracy mask MSK described in the first and second embodiments.

Although the invention made by the inventor of the present invention has been specifically described based on the embodiments, the present invention is not limited to the aforementioned embodiments. It is needless to say that various modifications are possible within a scope of the general description.

A part of the contents described in the embodiments will be described below although some of them have been already described in the aforementioned embodiments.

(1) A method for manufacturing a mask, including the steps of:

preparing a substrate having a main surface;

preparing first data for drawing a pixel pattern in an effective pixel formation region on the main surface of the substrate where the pixel pattern is formed, the pixel pattern being for forming a pixel component that constitutes a pixel;

preparing second data for drawing a reference pattern in a reference pattern formation region on the main surface of the substrate which surrounds the effective pixel formation region and where the reference pattern is formed, the reference pattern being for indicating a reference position where the pixel pattern should be arranged in the effective pixel formation region;

preparing identification data for distinguishing between the effective pixel formation region and the reference pattern formation region;

by using the first data, drawing the pixel pattern in the effective pixel formation region so as to be displaced from the reference position toward a center side of the effective pixel formation region, with the identification data superimposed on the first data; and by using the second data, drawing the reference pattern in the reference pattern formation region.

(2) A method for manufacturing a mask, including the steps of:
preparing a substrate having a main surface;
preparing first data drawn in a first cell, the first data being for drawing a pixel pattern in an effective pixel formation region on the main surface of the substrate where the pixel pattern is formed, the pixel pattern being for forming a pixel component that constitutes a pixel;
preparing second data drawn in a second cell different from the first cell, the second data being for drawing a reference pattern in a reference pattern formation region on the main surface of the substrate which surrounds the effective pixel formation region and where the reference pattern is formed, the reference pattern being for indicating a reference position where the pixel pattern should be arranged in the effective pixel formation region;
by using the first data, drawing the pixel pattern in the effective pixel formation region so as to be displaced from the reference position toward a center side of the effective pixel formation region; and
by using the second data, drawing the reference pattern in the reference pattern formation region, wherein
the first cell and the second cell are drawn on the same layer.

(3) A method for manufacturing a mask, including the steps of:
preparing a substrate having a main surface;
specifying coordinate ranges, on the main surface of the substrate, of an effective pixel formation region on the main surface of the substrate and a reference pattern formation region on the main surface of the substrate, the effective pixel formation region being a region where a pixel pattern for forming a pixel component that constitutes a pixel is formed, the reference pattern formation region being a region which surrounds the effective pixel formation region and where a reference pattern is formed, the reference pattern being for indicating a reference position where the pixel pattern should be arranged in the effective pixel formation region;
preparing first data for drawing the pixel pattern in the effective pixel formation region and second data for drawing the reference pattern in the reference pattern formation region;
by using the first data, drawing the pixel pattern in the effective pixel formation region so as to be displaced from the reference position toward a center side of the effective pixel formation region, while identifying the coordinate range; and
by using the second data, drawing the reference pattern in the reference pattern formation region, while identifying the coordinate range.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A mask, comprising:
a substrate having a main surface;
an effective pixel formation region arranged on said main surface of said substrate; and
a reference pattern formation region surrounding said effective pixel formation region on said main surface, wherein
a pixel pattern for forming a pixel component that constitutes a pixel is arranged in said effective pixel formation region,
a reference pattern for indicating a reference position where said pixel pattern should be arranged in said effective pixel formation region is arranged in said reference pattern formation region, and
said pixel pattern is arranged to be displaced from said reference position toward a center side of said effective pixel formation region.

2. The mask according to claim 1, wherein
in said reference pattern formation region, a dummy formation pattern is formed around said reference pattern so as to be spaced apart from said reference pattern.

3. The mask according to claim 1, wherein the pixel pattern is formed in a first layer of the mask and the reference pattern is formed in a second layer of the mask.

4. The mask according to claim 1, wherein spacing between patterns within the pixel pattern is smaller than spacing between patterns within the reference pattern.

5. The mask according to claim 1, wherein
said reference pattern is arranged to face said pixel pattern with an outer perimeter line in said effective pixel formation region interposed therebetween, and
said reference pattern is arranged to indicate said reference position in a direction along said outer perimeter line where said pixel pattern facing said reference pattern should be arranged.

6. The mask according to claim 5, wherein
said reference pattern has a planar shape that is symmetric with respect to an imaginary straight line as a symmetric line extending perpendicularly to said outer perimeter line on said main surface.

7. A semiconductor device, comprising:
a semiconductor substrate having a main surface;
an effective pixel region arranged on said main surface of said semiconductor substrate; and
a reference portion arrangement region surrounding said effective pixel region on said main surface, wherein
a pixel component that constitutes a pixel is arranged in said effective pixel region,
a reference portion for indicating a reference position where said pixel component should be arranged in said effective pixel region is arranged in said reference portion arrangement region, and
said pixel component is arranged to be displaced from said reference position toward a center side of said effective pixel region.

8. The semiconductor device according to claim 7, wherein
in said reference portion arrangement region, a dummy structure is formed around said reference portion so as to be spaced apart from said reference portion.

9. The semiconductor device according to claim 7, wherein
said reference portion is arranged to face said pixel component with an outer perimeter line in said effective pixel region interposed therebetween, and
said reference portion is arranged to indicate said reference position in a direction along said outer perimeter line where said pixel component facing said reference portion should be arranged.

10. The semiconductor device according to claim 9, wherein
said reference portion has a planar shape that is symmetric with respect to an imaginary straight line as a symmetric line extending perpendicularly to said outer perimeter line on said main surface.

11. A method for manufacturing a mask, the method comprising:
preparing a substrate having a main surface;
preparing first data drawn on a first layer, said first data being for drawing a pixel pattern in an effective pixel formation region on said main surface of said substrate where said pixel pattern is formed, said pixel pattern being for forming a pixel component that constitutes a pixel;
preparing second data drawn on a second layer different from said first layer, said second data being for drawing a reference pattern in a reference pattern formation region on said main surface of said substrate which surrounds said effective pixel formation region and where said reference pattern is formed, said reference pattern being for indicating a reference position where said pixel pattern should be arranged in said effective pixel formation region;
by using said first data, drawing said pixel pattern in said effective pixel formation region so as to be displaced from said reference position toward a center side of said effective pixel formation region; and
by using said second data, drawing said reference pattern in said reference pattern formation region.

12. The method for manufacturing a mask according to claim 11, further comprising forming a dummy formation pattern around the reference pattern so as to be spaced apart from the reference pattern.

13. The method for manufacturing a mask according to claim 11, wherein spacing between patterns within the pixel pattern is smaller than spacing between patterns within the reference pattern.

14. A method for manufacturing a mask, the method comprising:
preparing a substrate having a main surface;
preparing first data and second data, said first data being for drawing a pixel pattern in an effective pixel formation region on said main surface of said substrate where said pixel pattern is formed, said pixel pattern being for forming a pixel component that constitutes a pixel, said second data being for drawing a reference pattern in a reference pattern formation region on said main surface of said substrate which surrounds said effective pixel formation region and where said reference pattern is formed, said reference pattern being for indicating a reference position where said pixel pattern should be arranged in said effective pixel formation region;
preparing identification data for distinguishing between said effective pixel formation region and said reference pattern formation region;
by using said first data, drawing said pixel pattern in said effective pixel formation region so as to be displaced from said reference position toward a center side of said effective pixel formation region, with said identification data superimposed on said first data; and
by using said second data, drawing said reference pattern in said reference pattern formation region.

15. The method for manufacturing a mask according to claim 14, further comprising forming a dummy formation pattern around the reference pattern so as to be spaced apart from the reference pattern.

16. The method for manufacturing a mask according to claim 14, wherein spacing between patterns within the pixel pattern is smaller than spacing between patterns within the reference pattern.

17. The method for manufacturing a mask according to claim 14, wherein the pixel pattern is formed in a first layer of the mask and the reference pattern is formed in a second layer of the mask.

18. A method for manufacturing a mask, the method comprising:
preparing a substrate having a main surface;
preparing first data drawn in a first cell, said first data being for drawing a pixel pattern in an effective pixel formation region on said main surface of said substrate where said pixel pattern is formed, said pixel pattern being for forming a pixel component that constitutes a pixel;
preparing second data drawn in a second cell different from said first cell, said second data being for drawing a reference pattern in a reference pattern formation region on said main surface of said substrate which surrounds said effective pixel formation region and where said reference pattern is formed, said reference pattern being for indicating a reference position where said pixel pattern should be arranged in said effective pixel formation region;
by using said first data, drawing said pixel pattern in said effective pixel formation region so as to be displaced from said reference position toward a center side of said effective pixel formation region; and
by using said second data, drawing said reference pattern in said reference pattern formation region, wherein
said first cell and said second cell are drawn on the same layer.

19. A method for manufacturing a mask, the method comprising:
preparing a substrate having a main surface;
specifying coordinate ranges, on said main surface of said substrate, of an effective pixel formation region on said main surface of said substrate and a reference pattern formation region on said main surface of said substrate, said effective pixel formation region being a region where a pixel pattern for forming a pixel component that constitutes a pixel is formed, said reference pattern formation region being a region which surrounds said effective pixel formation region and where a reference pattern is formed, said reference pattern being for indicating a reference position where said pixel pattern should be arranged in said effective pixel formation region;
preparing first data for drawing said pixel pattern in said effective pixel formation region and second data for drawing said reference pattern in said reference pattern formation region;
by using said first data, drawing said pixel pattern in said effective pixel formation region so as to be displaced from said reference position toward a center side of said effective pixel formation region, while identifying said coordinate range; and
by using said second data, drawing said reference pattern in said reference pattern formation region, while identifying said coordinate range.

* * * * *